United States Patent
Motoyoshi et al.

(10) Patent No.: US 8,838,275 B2
(45) Date of Patent: Sep. 16, 2014

(54) ROBOT AND ROBOT CONTROL METHOD

(71) Applicant: Seiko Epson Corporation, Tokyo (JP)

(72) Inventors: Masaki Motoyoshi, Shiojiri (JP); Tomokazu Hirabayashi, Hara-mura (JP)

(73) Assignee: Seiko Epson Corporation (JP)

(*) Notice: Subject to any disclaimer, the term of this patent is extended or adjusted under 35 U.S.C. 154(b) by 181 days.

(21) Appl. No.: 13/623,432

(22) Filed: Sep. 20, 2012

(65) Prior Publication Data

US 2013/0073086 A1    Mar. 21, 2013

(30) Foreign Application Priority Data

Sep. 21, 2011  (JP) .................... 2011-205676

(51) Int. Cl.
*G05B 15/00* (2006.01)

(52) U.S. Cl.
CPC ...................... *G05B 15/00* (2013.01)
USPC ................ 700/258; 700/250; 700/252

(58) Field of Classification Search
USPC ................... 700/245, 248, 250, 252, 254
See application file for complete search history.

(56) References Cited

U.S. PATENT DOCUMENTS

2010/0318223 A1   12/2010  Motoyoshi et al.
2011/0010008 A1*   1/2011  Michel et al. ............ 700/250

FOREIGN PATENT DOCUMENTS

| JP | 01-173116 | 7/1989 |
| JP | 02-042502 | 2/1990 |
| JP | 07-009374 | 1/1995 |
| JP | 07-337055 | 12/1995 |
| JP | 2010-284725 | 12/2010 |
| JP | 2010-284770 | 12/2010 |

* cited by examiner

*Primary Examiner* — Ian Jen
(74) *Attorney, Agent, or Firm* — Harness, Dickey & Pierce, P.L.C.

(57) ABSTRACT

An arm drive mechanism which rotates an arm, an angle sensor which detects a rotation angle of the arm drive mechanism and outputs angle information, an angular velocity sensor which is attached to the arm, detects angular velocity acting on the arm and outputs angular velocity information, a control command generating unit which outputs a control command value prescribing a rotational operation of the arm, a gain adjusting unit which incrementally or decrementally changes and thus adjusts a gain of the angular velocity information, and an arm operation control unit which controls an operation of the arm based on the control command value, the angle information and the gain-adjusted angular velocity information, are provided.

15 Claims, 13 Drawing Sheets

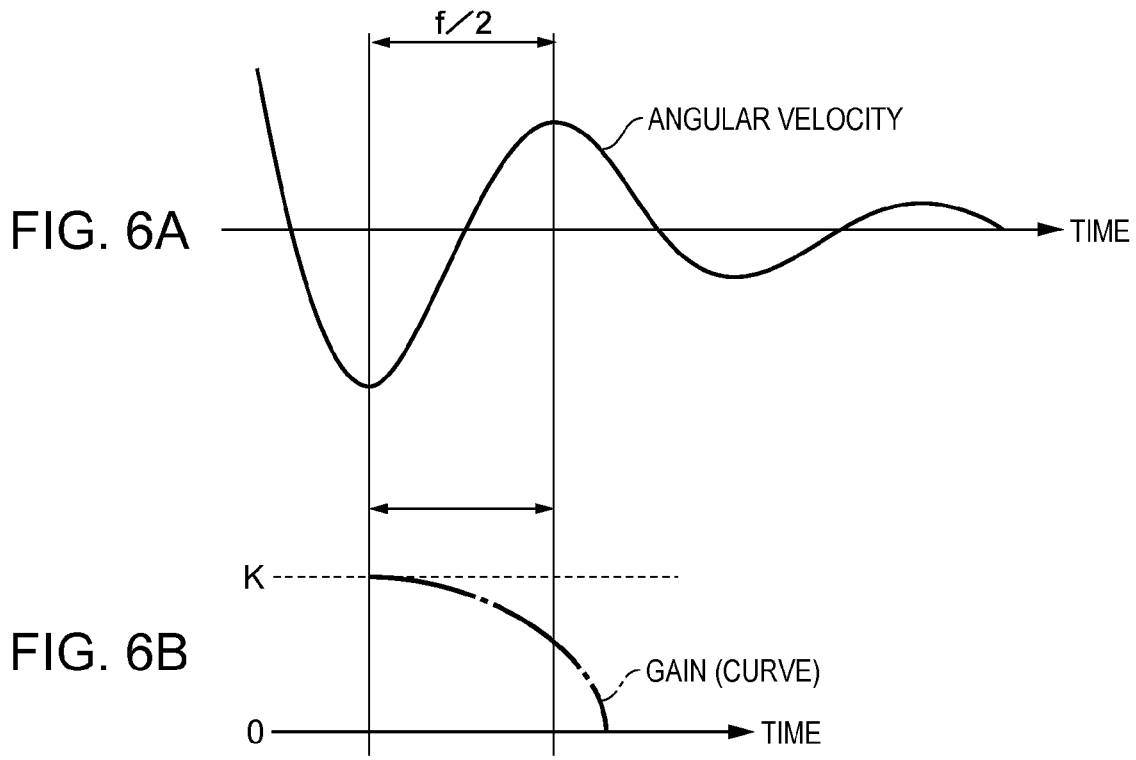
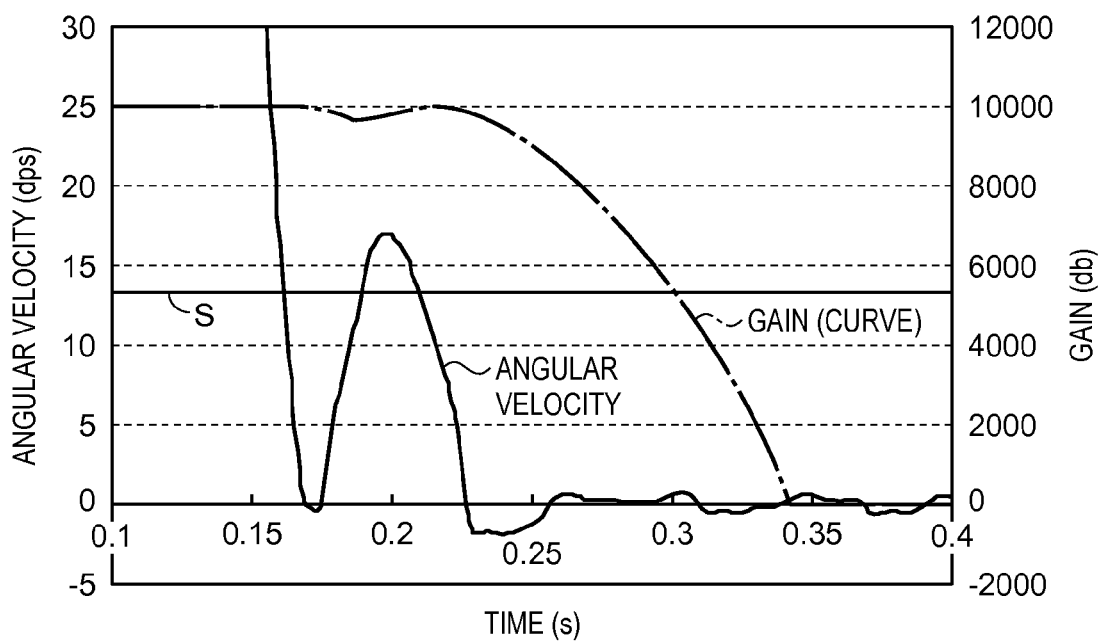

ROBOT AND ROBOT CONTROL METHOD

BACKGROUND

1. Technical Field

The present invention relates to a robot and a robot control method.

2. Related Art

Traditionally, a robot or the like which moves a terminal device attached to a distal end of an arm to a desired position by rotation or the like of the arm and then causes the terminal device to operate at that position is known. For example, a member supplying and removing device which has a gripping terminal and supplies and removes a worked member to and from a working device, a painting robot having a painting terminal, a welding robot having a welding terminal and the like are known.

When driving a robot, a control method in which a rotational angle of a drive source such as a motor that drives an arm of the robot is measured and then the position or the like of a distal end side of the arm is controlled based on the measured angle information is used. However, since a transmission mechanism which transmits a driving force from the drive source to the arm and the arm are not rigid bodies, the transmission mechanism and the arm may deform. Because of this deformation of the transmission mechanism and the arm, there is a problem that the arm may vibrate. To address this problem, a technique in which an inertial sensor is attached to the distal end of the arm to measure the movement of the distal end and then angular velocity information obtained from the inertial sensor is used for control is proposed. JP-A-7-9374 discloses a multi-joint robot control method and a multi-joint robot in which the operation of an arm is controlled based on an output signal from an inertial sensor and thus a reduction in accuracy due to vibration can be prevented.

However, in the case of JP-A-7-9374, the output from the inertial sensor includes errors such as reference potential drift and noise. If such information is used to carry out control, there is a possibility that the control cannot be carried out correctly or there is a problem that stability may be lowered.

SUMMARY

An advantage of some aspects of the invention is to solve at least a part of the problems described above, and the invention can be implemented as the following forms or application examples.

Application Example 1

This application example is directed to a robot including an arm, a drive source, an angle sensor, an inertial sensor, and a control command generating unit. The arm is rotatably supported at one end. The drive source rotates the arm. The angle sensor detects a rotational angle of the drive source and outputs angle information. The inertial sensor is attached to the arm, detects an inertial force acting on the arm, and outputs inertial force information. The control command generating unit outputs a control command value which prescribes a rotational operation of the arm. A weighting adjusting unit incrementally or decrementally changes and thus adjusts a weighting value of the inertial force information. An arm operation control unit controls an operation of the arm based on the control command value, the angle information, and the inertial force information weighted with the weighting value.

According to the above robot, the weighting adjusting unit incrementally or decrementally changes the weighting value of the inertial force information. The arm operation control unit controls the operation of the arm based on the control command value, the angle information, and the inertial force information weighted with the weighting value that is incrementally or decrementally changed. Thus, adverse effects on the machine life, of vibration of the arm due to a sudden change in the inertial force information or of a mechanical load on the drive source and decelerator, can be restrained.

Application Example 2

In the robot, it is preferable that the weighting adjusting unit carries out at least one of an adjustment to increment the weighting value of the inertial force information in the case where the arm shifts from a standstill state to a rotating state and an adjustment to decrement the weighting value of the inertial force information in the case where the arm shifts from the rotating state to the standstill state.

According to the above robot, in the case where the arm shifts from the standstill state to the rotating state, the adjustment to increment the weighting value of the inertial force information can be made. Thus, when shifting from the state where the inertial force information is not used to the state where the inertial force information is used for positioning, a sudden change in the inertial force information can be restrained. Also, in the case where the arm shifts from the rotating state to the standstill state, the adjustment to decrement the weighting value of the inertial force information can be made. Thus, when shifting from the state where the inertial force information is used to the state where the inertial force information is not used for positioning, a sudden change in the inertial force information can be restrained.

Application Example 3

In the robot, it is preferable that the weighting adjusting unit increases a variation width of the weighting value with the lapse of time.

According to the above robot, as the variation width of the weighting is increased with the lapse of time, the variation width of the inertial force information can be made small at first and the variation width of the inertial force information can later be made increasingly greater. Thus, when shifting from the state where the variation width of the vibration of the arm is small to the state where the variation width is large, the use of the inertial force information can be made small at first and the use of the inertial force information can later be made increasingly quickly greater. Meanwhile, when shifting from the state where the variation width of the vibration of the arm is large to the state where the variation width is small, the use of the inertial force information can be made great at first and the use of the inertial force information can later be made increasingly quickly smaller. In short, the inertial force information that is weighted appropriately according to the variation width of the vibration of the arm can be used with the lapse of time.

Application Example 4

In the robot, it is preferable that the weighting adjusting unit changes the weighting value during a time period equal to or longer than half a vibration period of the arm due to the rotation of the arm.

According to the above robot, the weighting value is changed during the time period equal to or longer than half the vibration period of the arm due to the rotation. Thus, even if the variation width of the vibration of the arm is large, the weighting value can be changed for a time period equal to or longer than the time required to cope with the variation width, and a sudden change in the inertial force information can be restrained.

Application Example 5

In the robot, it is preferable that the weighting adjusting unit compares the inertial force information with a threshold value that is preset for the inertial force information and changes the weighting value.

According to the above robot, the inertial force information is compared with the preset threshold value and the weighting value is changed. Thus, as the threshold value of the inertial force information is set based on the influence of an error of the inertial force information due to noise or the like, the inertial force information can be compared with the threshold value and the weighting value can be changed. Therefore, the inertial force information with restrained error can be utilized.

Application Example 6

In the robot, it is preferable that the weighting adjusting unit compares the angle information with a threshold value that is preset for the angle information and changes the weighting value.

According to the above robot, the angle information is compared with the preset threshold value and the weighting value is changed. Thus, as the threshold value of the angle information is set based on the influence of an error of the angle information due to noise or the like, the angle information can be compared with the threshold value and the weighting value can be changed. Therefore, the angle information with restrained error can be utilized.

Application Example 7

In the robot, it is preferable that the weighting adjusting unit compares a time elapsed from a time point when the rotational operation of the arm prescribed by the control command value stops, with a threshold value that is preset for the time elapsed, and changes the weighting value.

According to the above robot, the time elapsed from the time point when the rotational operation of the arm prescribed by the control command value stops is compared with the preset threshold value and the weighting value is changed. Thus, as the threshold value of the time elapsed is set based on the influence of an error of the inertial force information due to noise or the like, the actual time elapsed can be compared with the threshold value and the weighting value can be changed. Therefore, the inertial force information with restrained error can be used.

Application Example 8

This application example is directed to a robot including an arm, a drive source, an angle sensor, an inertial sensor, and a control command generating unit. The arm is rotatably supported at one end. The drive source rotates the arm. The angle sensor detects a rotational angle of the drive source and outputs angle information. The inertial sensor is attached to the arm, detects an inertial force acting on the arm, and outputs inertial force information. The control command generating unit outputs a control command value which prescribes a rotational operation of the arm. A weighting adjusting unit carries out at least one of an adjustment to increment the weighting value of the inertial force information in the case where the arm shifts from a standstill state to a rotating state and an adjustment to decrement the weighting value of the inertial force information in the case where the arm shifts from the rotating state to the standstill state. An arm operation control unit controls an operation of the arm based on the control command value, the angle information, and the inertial force information weighted with the weighting value.

According to the above robot, in the case where the arm shifts from the standstill state to the rotating state, the adjustment to increment the weighting value of the inertial force information can be made. Thus, when shifting from the state where the inertial force information is not used to the state where the inertial force information is used for positioning, a sudden change in the inertial force information can be restrained. Also, in the case where the arm shifts from the rotating state to the standstill state, the adjustment to decrement the weighting value of the inertial force information can be made. Thus, when shifting from the state where the inertial force information is used to the state where the inertial force information is not used for positioning, a sudden change in the inertial force information can be restrained. Therefore, adverse effects on the machine life, of vibration of the arm due to a sudden change in the inertial force information or of a mechanical load on the drive source and decelerator, can be restrained.

Application Example 9

In the robot, it is preferable that the weighting adjusting unit increases a variation width of the weighting value with the lapse of time.

According to the above robot, as the variation width of the weighting is increased with the lapse of time, the variation width of the inertial force information can be made small at first and the variation width of the inertial force information can later be made increasingly greater. Thus, when shifting from the state where the variation width of the vibration of the arm is small to the state where the variation width is large, the use of the inertial force information can be made small at first and the use of the inertial force information can later be made increasingly quickly greater. Meanwhile, when shifting from the state where the variation width of the vibration of the arm is large to the state where the variation width is small, the use of the inertial force information can be made great at first and the use of the inertial force information can later be made increasingly quickly smaller. In short, the inertial force information that is weighted appropriately according to the variation width of the vibration of the arm can be used with the lapse of time.

Application Example 10

In the robot, it is preferable that the weighting adjusting unit changes the weighting value during a time period equal to or longer than half a vibration period of the arm due to the rotation of the arm.

According to the above robot, the weighting value is changed during the time period equal to or longer than half the vibration period of the arm due to the rotation. Thus, even if the variation width of the vibration of the arm is large, the weighting value can be changed for a time period equal to or longer than the time required to cope with the variation width, and a sudden change in the inertial force information can be restrained.

Application Example 11

In the robot, it is preferable that the weighting adjusting unit compares the inertial force information with a threshold value that is preset for the inertial force information and changes the weighting value.

According to the above robot, the inertial force information is compared with the preset threshold value and the weighting value is changed. Thus, as the threshold value of the inertial force information is set based on the influence of an error of the inertial force information due to noise or the like, the inertial force information can be compared with the threshold value and the weighting value can be changed. Therefore, the inertial force information with restrained error can be utilized.

Application Example 12

In the robot, it is preferable that the weighting adjusting unit compares the angle information with a threshold value that is preset for the angle information and changes the weighting value.

According to the above robot, the angle information is compared with the preset threshold value and the weighting value is changed. Thus, as the threshold value of the angle information is set based on the influence of an error of the angle information due to noise or the like, the angle information can be compared with the threshold value and the weighting value can be changed. Therefore, the angle information with restrained error can be utilized.

Application Example 13

In the robot, it is preferable that the weighting adjusting unit compares a time elapsed from a time point when the rotational operation of the arm prescribed by the control command value stops, with a threshold value that is preset for the time elapsed, and changes the weighting value.

According to the above robot, the time elapsed from the time point when the rotational operation of the arm prescribed by the control command value stops is compared with the preset threshold value and the weighting value is changed. Thus, as the threshold value of the time elapsed is set based on the influence of an error of the inertial force information due to noise or the like, the actual time elapsed can be compared with the threshold value and the weighting value can be changed. Therefore, the inertial force information with restrained error can be used.

Application Example 14

This application example is directed to a robot including a main scanning direction movement mechanism, a sub scanning direction movement mechanism, an up-and-down movement mechanism, a holding mechanism, plural distance sensors, and plural acceleration sensors. The main scanning direction movement mechanism includes plural main scanning guide rails, a main scanning linear motor, a scanning plate, and a main scanning slider. The main scanning linear motor is formed on the plural main scanning guide rails. The scanning plate is laid between the plural main scanning guide rails, extends in a sub scanning direction that is substantially orthogonal to a main scanning direction, and can be moved in the main scanning direction by the main scanning linear motor and the main scanning slider. The sub scanning direction movement mechanism includes a sub scanning linear motor formed on the scanning plate and a sub scanning slider formed on a sub scanning frame. The sub scanning frame can be moved in the sub scanning direction by the sub scanning linear motor and the sub scanning slider. The up-and-down movement mechanism includes a ball bearing arranged on the sub scanning frame, a ball bearing drive motor, and a ball screw fixed to an up-and-down shaft. The up-and-down shaft can be moved up and down by the ball bearing, the ball bearing drive motor and the ball screw. The holding mechanism can be moved by the main scanning direction movement mechanism, the sub scanning direction movement mechanism and the up-and-down movement mechanism. The distance sensors detect moving distance information of movement generated by each of the main scanning linear motor, the sub scanning linear motor and the ball bearing drive motor. The acceleration sensors detect acceleration information in each of the main scanning direction, the sub scanning direction and an up-and-down direction. Movement of the holding mechanism is controlled based on the moving distance information and the acceleration information.

According to the above robot, the holding mechanism can be moved by the main scanning direction movement mechanism, the sub scanning direction movement mechanism and the up-and-down movement mechanism. The distance sensors detect moving distance information of movement generated by each of the main scanning linear motor, the sub scanning linear motor and the ball bearing drive motor. The acceleration sensors detect acceleration information in each of the main scanning direction, the sub scanning direction and an up-and-down direction. The movement of the holding mechanism is controlled based on the moving distance information and the acceleration information. Therefore, adverse effects on the machine life, of vibration of the arm due to a sudden change in the acceleration information or of a mechanical load on the drive source and decelerator, can be restrained.

Application Example 15

In the robot, it is preferable that a threshold value is set for the moving distance information or the acceleration information, the moving distance information or the acceleration information is compared with the threshold value, a weighting value of the acceleration information is adjusted, and the holding mechanism is moved and positioned.

According to the above robot, the moving distance information or the acceleration information is compared with the preset threshold value and the weighting value is changed. Thus, as a threshold value of time elapsed can be set based on the influence of an error of the acceleration information due to noise or the like, the actual time elapsed can be compared with the threshold value and the weighting value can be changed. Thus, the acceleration information with restrained error can be used.

Application Example 16

This application example is directed to a control method for a robot including an arm, a drive source, an angle sensor, an inertial sensor, and a control command generating unit. The arm is rotatably supported at one end. The drive source rotates the arm. The angle sensor detects a rotational angle of the drive source and outputs angle information. The inertial sensor is attached to the arm, detects an inertial force acting on the arm, and outputs inertial force information. The method includes: causing the control command generating unit to output a control command value which prescribes a rotational operation of the arm; incrementally or decrementally changing and thus adjusting a weighting value of the inertial force information; and controlling an operation of the arm based on the control command value, the angle information, and the inertial force information weighted with the weighting value.

According to the above robot control method, the weighting value of the inertial force information is incrementally or decrementally changed and the operation of the arm is controlled based on the control command value, the angle information, and the inertial force information weighted with the weighting value that is incrementally or decrementally changed. Thus, adverse effects on the machine life, of vibration of the arm due to a sudden change in the inertial force information or of a mechanical load on the drive source and decelerator, can be restrained.

BRIEF DESCRIPTION OF THE DRAWINGS

The invention will be described with reference to the accompanying drawings, wherein like numbers reference like elements.

FIG. 4A shows the relation between lapse of time and angular velocity. FIGS. 4B and 4C show the relation between lapse of time and gain.

FIG. 5A shows the relation between lapse of time and angular velocity. FIGS. 5B and 5C show the relation between lapse of time and gain.

FIGS. 6A and 6B illustrate lapse of time until gain is reduced from a target value to 0 just before the arm stops. FIG. 6A shows the relation between lapse of time and angular velocity. FIG. 6B shows the relation between lapse of time and gain.

FIG. 7 shows an example of actual measured value of gain adjustment just before the arm stops.

FIG. 8A shows the relation between lapse of time and angular velocity. FIG. 8B is an enlarged view of FIG. 8A corresponding to a period just before the arm stops.

FIG. 9A shows the relation between lapse of time and angle. FIG. 9B is an enlarged view of FIG. 9A corresponding to a period just before the arm stops.

FIG. 10A shows the relation between lapse of time and angular velocity. FIG. 10B is an enlarged view of FIG. 10A corresponding to a period just before the arm stops.

FIG. 11A shows the relation between lapse of time and angular velocity. FIG. 11B is an enlarged view of FIG. 11A corresponding to a period just before the arm stops.

DESCRIPTION OF EXEMPLARY EMBODIMENTS

First Embodiment

Figure 1:
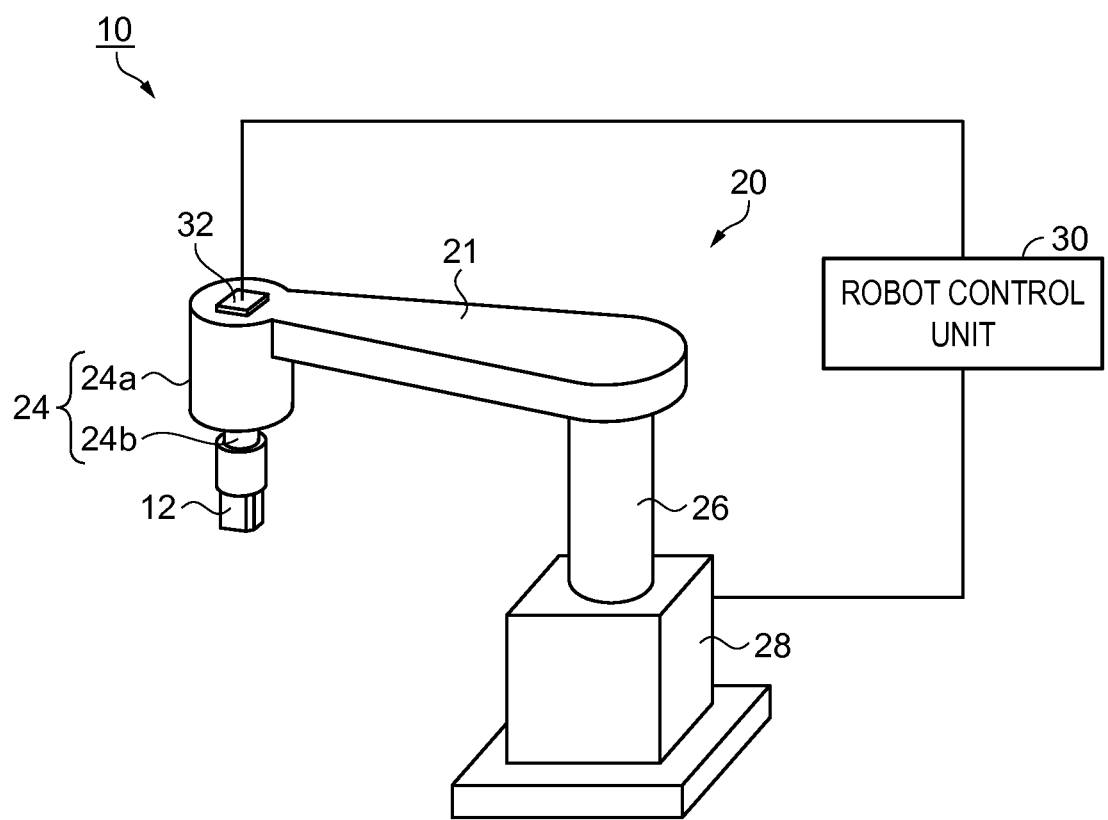
FIG. 1 is an external perspective view showing a schematic configuration of a robot according to a first embodiment.

Hereinafter, a robot according to a first embodiment will be described with reference to the drawings. In the drawings, in order to improve visibility, dimensions and proportions of components are varied when appropriate.

Schematic Configuration of Robot

The schematic configuration of a robot 10 will be described. FIG. 1 is an external perspective view showing the schematic configuration of the robot 10 according to the first embodiment. As shown in FIG. 1, the robot 10 includes a robot mechanism 20 and a robot control unit 30. The robot mechanism 20 includes a holding hand 12, a hand holding mechanism 24, an arm 21, an arm shaft portion 26, a machine stand 28, an angular velocity sensor 32, an angle sensor 34 (see FIG. 2) and the like. The robot 10 is a so-called SCARA robot having the one arm 21 that is horizontally rotatable.

The machine stand 28 supports the arm shaft portion 26 via a built-in bearing mechanism (not shown) in such a way that the arm shaft portion 26 is rotatable about a rotation axis of the arm shaft portion 26. The arm shaft portion 26 is connected to the machine stand 28 via an arm drive motor 22 (see FIG. 2) and an arm drive mechanism 23 (see FIG. 2) which are installed within the machine stand 28, and the arm shaft portion 26 is rotated by the arm drive motor 22. The angle sensor 34 is connected to the arm drive motor 22, and the rotation angle of the arm drive motor 22 is measured (detected) by the angle sensor 34.

One end of the arm 21 is fixed to an end of the arm shaft portion 26 that is opposite to the side supported by the machine stand 28. The arm 21 is rotated about the rotation axis of the arm shaft portion 26 by the arm drive motor 22. The rotation angle of the arm 21 is approximately measured by measuring the rotation angle of the arm drive motor 22 with the angle sensor 34.

The hand holding mechanism 24 is fixed to an end of the arm 21 that is opposite to the side fixed to the arm shaft portion 26. The hand holding mechanism 24 includes a holding bearing 24a fixed to the arm 21 and a holding mechanism shaft 24b slidably supported by the holding bearing 24a. The holding mechanism shaft 24b can be slid in the axial direction of the holding mechanism shaft 24b in relation to the holding bearing 24a, by an up-and-down drive source, not shown. The axial direction of the holding mechanism shaft 24b is substantially parallel to the axial direction of the arm shaft portion 26. The holding hand 12 is attached to a free end of the holding mechanism shaft 24b. As the arm 21 is rotated, the holding hand 12 is situated at a position facing an object to be carried. As the holding mechanism shaft 24b is slid in relation to the holding bearing 24a, the holding hand 12 is moved into contact with or away from the object to be carried, and the object to be carried that is held by the holding hand 12 is lifted from the place where the object is placed, or is moved toward the place where the object is to be placed.

On the hand holding mechanism 24 to which the holding hand 12 is attached, the angular velocity sensor 32 is fixed to the side opposite to the holding hand 12. The angular velocity sensor 32 is fixed at the distal end of the arm 21 and can measure (detect) the angular velocity at which the arm 21 is rotated. The robot control unit 30 supervises and controls the operation of each part of the robot 10, based on a control program that is input in advance via an information input and output device (not shown).

Functional Configuration of Robot Mechanism Drive

Next, a functional configuration to drive the robot mechanism 20 will be described.

Figure 2:
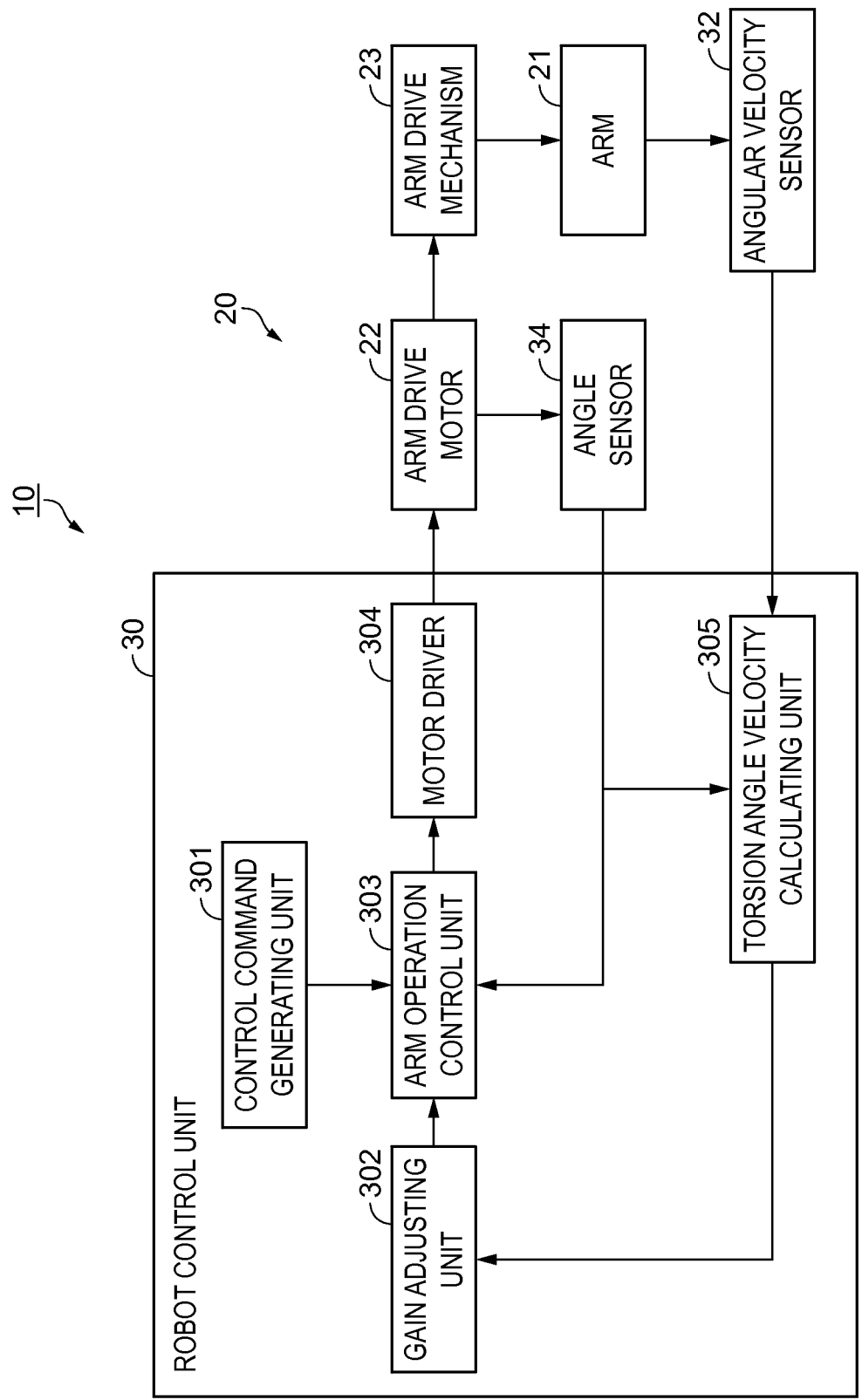
FIG. 2 is a block diagram showing a functional configuration to drive a robot mechanism.

FIG. 2 is a block diagram showing the function configuration to drive the robot mechanism 20. As shown in FIG. 2, the robot 10 includes the arm drive motor 22 as a drive source, the arm drive mechanism 23, the angular velocity sensor 32, the angle sensor 34 and the robot control unit 30, in order to rotate the arm 21. Here, as the angular velocity sensor 32, for example, a gyro sensor can be used. As the angle sensor 34, for example, an encoder can be used.

The robot control unit 30 includes a control command generating unit 301, a gain adjusting unit 302, an arm operation control unit 303, a motor driver 304, a torsion angular velocity calculating unit 305 and the like.

The control command generating unit 301 outputs a control command value which prescribes a rotational operation of the arm 21, in order to execute an operation command to the robot mechanism 20 based on a working command to supply or remove a member. Here, the working command to supply or remove a member is inputted to the robot 10 from an input device, not shown. Then, the operation command to the robot mechanism 20 based on the working command is outputted to the control command generating unit 301 from a supervision and control unit (not shown) provided in the robot control unit 30. Then, as the control command value of the arm 21 outputted from the control command generating unit 301, for example, the trajectory of the distal end of the arm 21 is indicated in the form of the angle of the arm 21 of every time period.

The arm operation control unit 303 outputs a control signal of the arm drive motor 22 in order to execute the control command value of the arm 21 outputted from the control command generating unit 301. At this time, the arm operation control unit 303 generates and outputs an optimum control signal of the arm drive motor 22 for executing the control command value of the arm 21, based on angle information from the angle sensor 34 and angular velocity information from the angular velocity sensor 32. The angular velocity sensor 32 is equivalent to an inertial sensor. The angular velocity information is equivalent to inertial force information.

The torsion angular velocity calculating unit 305 calculates a torsion angular velocity which is a torsional component, based on the difference between the angle information from the angle sensor 34 and the angular velocity information from the angular velocity sensor 32. The gain adjusting unit 302 decides a gain that provides a target value for correcting the angular velocity information, based on the calculated torsion angular velocity. Then, in predetermined timing, later described, gain adjustment to adjust the amount of correction of the angular velocity information is carried out. The gain adjusting unit 302 is equivalent to a weighting adjusting unit. The gain is equivalent to a weighting value.

The motor driver 304 supplies electric power to the arm drive motor 22 and thus controls the arm drive motor 22.

Process of Rotating the Arm 21

Next, a process of controlling the driving of the arm drive motor 22 to rotate the arm 21 and thus situate the holding hand 12 attached to the distal end of the arm 21 at a predetermined position will be described.

Figure 3:
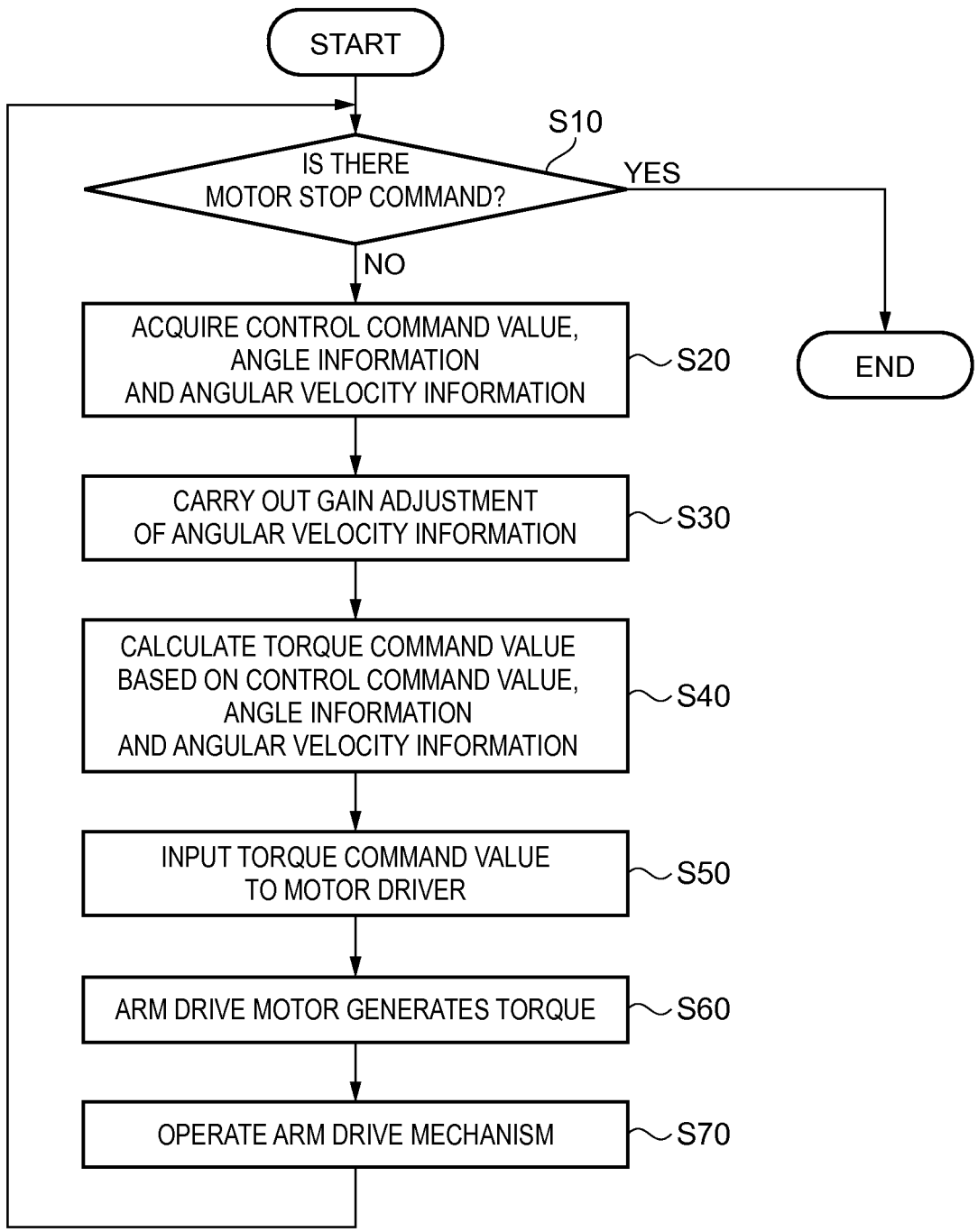
FIG. 3 is a flowchart showing a process in which the driving of an arm drive motor is controlled to rotate an arm.

FIG. 3 is a flowchart showing the process of controlling the driving of the arm drive motor 22 and thus rotating the arm 21.

First, the robot 10 determines whether there is a motor stop command or not (step S10). The motor stop command is a command to stop the arm drive motor 22 and end the control of the arm drive motor 22.

If there is a motor stop command (step S10: YES), the driving of the arm drive motor 22 is stopped and the process of situating the holding hand 12 at a predetermined position ends.

Meanwhile, if there is no motor stop command (step S10: NO), the process goes to the next step S20.

In step S20, the robot 10 causes the arm operation control unit 303 to acquire a control command value, angle information and angular velocity information. Specifically, a control command value outputted from the control command generating unit 301 is inputted to the arm operation control unit 303. Also, the rotation angle of the arm drive motor 22 is measured by the angle sensor 34 connected to the arm drive motor 22 and the angle information is inputted to the arm operation control unit 303. Moreover, the angular velocity of the arm 21 is measured by the angular velocity sensor 32 fixed near the distal end of the arm 21 and the angular velocity information is inputted to the arm operation control unit 303.

Next, the robot 10 causes the gain adjusting unit 302 to carry out gain adjustment in which the gain of the angular velocity information acquired in step S20 is adjusted to correct the angular velocity information (step S30). Gain adjustment is an adjustment to increase or decrease the gain of the angular velocity information. If the gain is 0, the angular velocity information is not used. Gain adjustment will be described in detail later.

Next, the robot 10 causes the arm operation control unit 303 to calculate a torque command value of the arm drive motor 22, based on the control command value and the angle information acquired in step S20 and the angular velocity information that is gain-adjusted in step S30 (step S40).

Next, the robot 10 inputs the torque command value calculated in step S40 to the motor driver 304 (step S50).

Next, the robot 10 causes the motor driver 304 to supply electric power corresponding to the torque command value to the arm drive motor 22. Then, the arm drive motor 22 generates a torque corresponding to the supplied electric power (step S60).

Next, the robot 10 operates the arm drive mechanism 23 connected to the arm drive motor 22, with the torque that is generated in the arm drive motor 22 (step S70). Then, the angular velocity of the arm 21 connected via the arm drive mechanism 23 is accelerated or decelerated.

Next, the robot 10 returns to step S10 and repeats the process of rotating the arm 21 and situating the holding hand 12 at a predetermined position until a motor stop command is given.

Gain Adjustment

Next, gain adjustment to correct the angular velocity information will be described in detail.

Figure 4A:
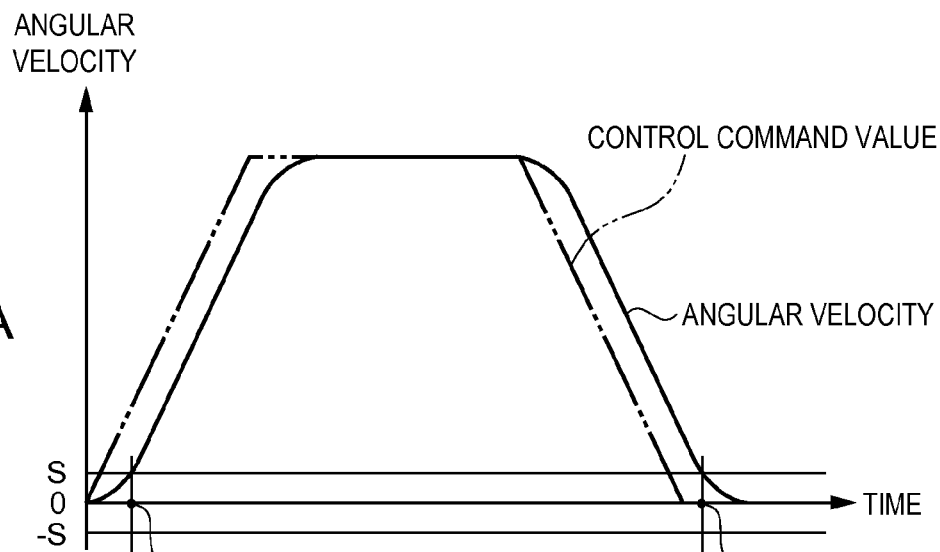
FIGS. 4A to 4C illustrate an example of gain adjustment of angular velocity during the rotation of the arm.
Figure 4B:
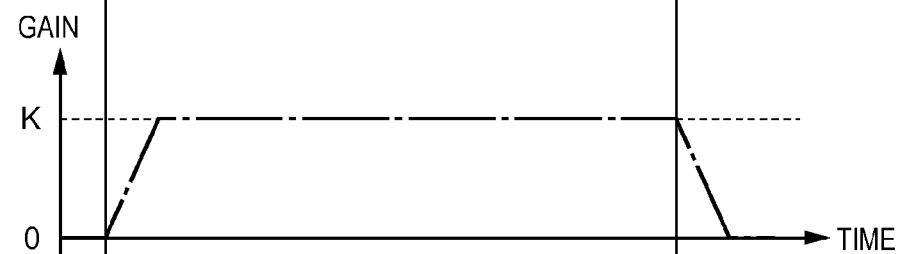
Figure 4C:
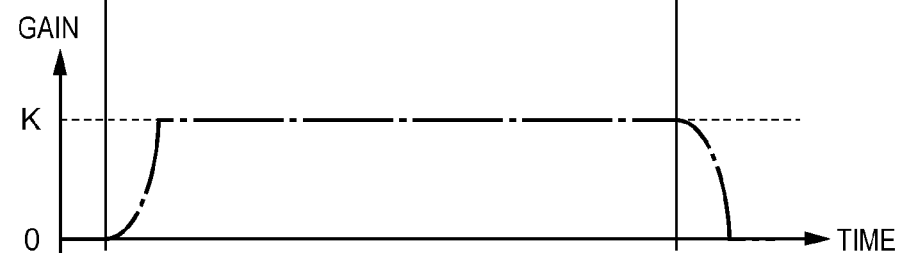

FIGS. 4A to 4C illustrate an example of gain adjustment of the angular velocity during the rotation of the arm 21. FIG. 4A shows the relation between lapse of time and angular velocity. FIGS. 4B and 4C show the relation between lapse of time and gain. In FIG. 4A, the graph shown by a double chain-dotted line represents the angular velocity of every time elapsed of the arm 21 designated as the control command value. The graph shown by a solid line represents the angular velocity of every time elapsed of the arm 21 measured by the angular velocity sensor 32. The graphs of FIGS. 4B and 4C show the gain for correcting the angular velocity of the arm 21 measured by the angular velocity sensor 32, every time elapsed.

As the arm 21 in the standstill state starts rotating, the angular velocity increases and reaches a threshold value S at a time point p1, as shown in FIG. 4A. From this time point p1, the gain which is 0 up to this point is incremented to reach a target value K, as shown in FIGS. 4B and 4C. At this time, in FIG. 4B, the gain increases with a linear slope, whereas in FIG. 4C, the gain increases with the slope of a quadratic curve where the variation width increases with the lapse of time.

Meanwhile, as the arm 21 in the rotating state approaches a target position, the angular velocity decreases and reaches the threshold value S at a time point p2, as shown in FIG. 4A. From this time point p2, the gain which holds the target value K up to this point is decremented to reach 0, as shown in FIGS. 4B and 4C. At this time, in FIG. 4B, the gain decreases with a linear slope, whereas in FIG. 4C, the gain decreases with the slope of a quadratic curve where the variation width increases with the lapse of time.

Figure 5A:
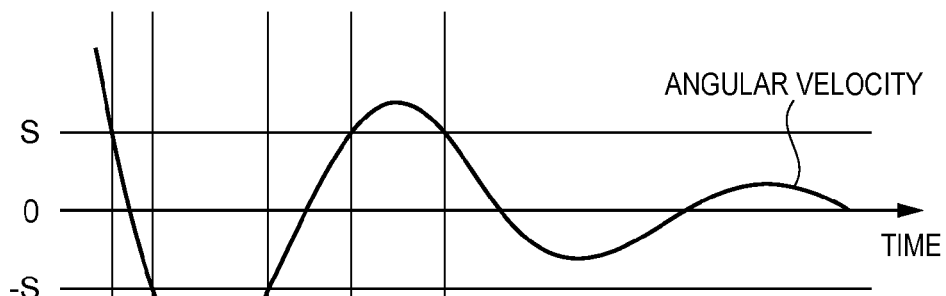
FIGS. 5A to 5C illustrate an example of gain adjustment of angular velocity just before the arm stops.
Figure 5B:
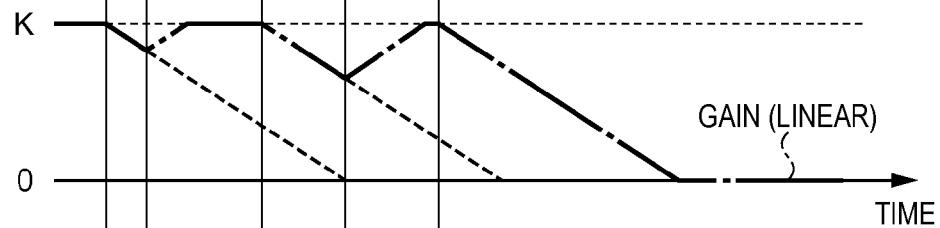
Figure 5C:
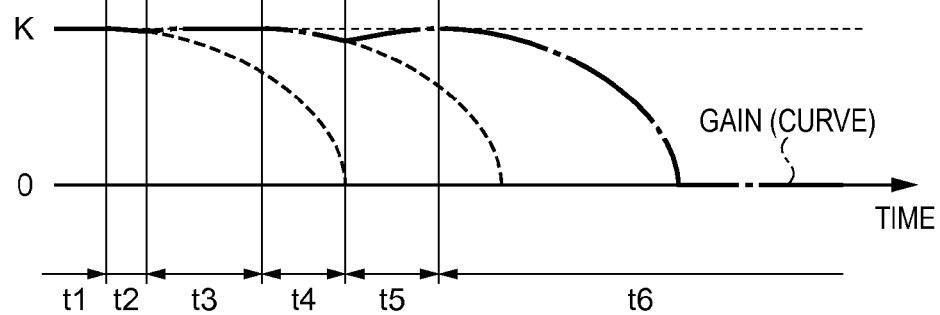

In this embodiment, an example in which the gain increases or decreases with the slope of a quadratic curve is described. However, not only quadratic curves but also other curves, for example, cubic or higher-order functions and sine waves, may be used. In the case of a quadratic curve, there is an advantage that the volume of arithmetic operation is relatively small and that the variation width increases with the lapse of time. FIGS. 5A to 5C illustrate an example of gain adjustment just before the arm 21 stops. FIG. 5A shows the relation between lapse of time and angular velocity. FIGS. 5B and 5C show the relation between lapse of time and gain. The graph indicated by a solid line in FIG. 5A represents the angular velocity for every time elapsed of the arm 21 measured by the angular velocity sensor 32. FIG. 5A shows the state of mechanical vibration of the arm 21 caused by rotating the arm 21 in such a way as to return the holding hand 12 which passes a target position. In this manner, a time for the mechanical vibration to subside is needed before the arm 21 stops after reaching the target position.

From a time point when the angular velocity reaches a threshold value S after decreasing, as shown in FIG. 5A, the gain which holds a target value K up to this point is decremented, as shown in FIGS. 5B and 5C. From a time point when the angular velocity reaches a threshold value −S after decreasing, conversely the gain is incremented to reach the original target value K. The decrease and increase of the gain is repeated until the gain finally reaches 0. In FIG. 5B, the increase and decrease of the gain is shown with a linear slope. In FIG. 5C, the increase and decrease of the gain is shown with the slope of a quadratic curve.

Specifically, if the gain to be found is G, the target value of the gain is K, a constant used is a and the time elapsed in each interval is ti, in an interval t1 of FIGS. 5A to 5C, the gain is calculated as G=K both in FIGS. 5B and 5C and the gain G is maintained at the target value K.

In an interval t2, the gain is calculated as G=K(1−(axti)) in FIGS. 5B and G=K(1−(axti)$^2$) in FIG. 5C. Therefore, the gain G decreases from the target value K.

In an interval t3, if the final G in the interval t2 is G2, the gain is calculated as G=G2+K(axti) in FIGS. 5B and G=G2+K(axti)$^2$ in FIG. 5C (where K is the upper limit of G). Therefore, the gain G increases to reach the target value K. In an interval t4, the gain is calculated as G=K(1−(axti)) in FIGS. 5B and G=K(1−(axti)$^2$) in FIG. 5C. Therefore, the gain G decreases again from the target value K.

In an interval t5, if the final G in the interval t4 is G4, the gain is calculated as G=G4+K(axti) in FIGS. 5B and G=G4+K(axti)$^2$ in FIG. 5C (where K is the upper limit of G). Therefore, the gain G increases again to reach the target value K.

In an interval t6, the gain is calculated as G=K(1−(axti)) in FIGS. 5B and G=K(1−(axti)$^2$) in FIG. 5C. Therefore, the gain G decreases once again from the target value K and ultimately maintains G=0.

Here, as the timing of obtaining the gain, the above arithmetic operation may be carried out successively to find the gain during the operation of the arm 21. Alternatively, the result of the above arithmetic operation for the gain of every time elapsed may be saved in advance as data in a table or the like and the saved data may be referred to during the operation of the arm 21.

FIGS. 6A and 6B illustrate the lapse of time until the gain at the target value K is decreased to 0, just before the arm 21 stops. FIG. 6A shows the relation between lapse of time and angular velocity. FIG. 6B shows the relation between lapse of time and gain. In FIG. 6A, an interval that is half the mechanical vibration period of the arm 21 is shown as f/2. In FIG. 6B, the time required for a gain adjustment to reduce the gain from the target value K to 0 with the slope of a quadratic curve is shown as being longer than the interval f/2. Although not shown, also the time required for a gain adjustment to reduce the gain from the target value K to 0 with a linear slope is longer than the interval f/2.

Here, due to factors such as the attitude of the arm 21 and the load of an object to be carried that is held by the holding hand 12, the above mechanical vibration period changes. Therefore, the constant used to calculate gain adjustment may be changed in accordance with these factors. Also, the constant may be fixed in order to reduce the volume of arithmetic operation. In such a case, if the constant is prescribed by a condition that the longest vibration period is achieved (where the maximum load is achieved in an attitude that increases inertia in terms of the motor shaft), the constant can be applied to cases of any condition.

FIG. 7 shows an example of actual measured value of gain adjustment just before the arm 21 stops. The graph indicated by a solid line in FIG. 7 represents the actual measured value of angular velocity for every time elapsed of the arm 21 measured by the angular velocity sensor 32. The graph indicated by a chain-dotted line represents the gain for correcting the actual measured value of the angular velocity of the arm 21 measured by the angular velocity sensor 32, every time elapsed. Here, the threshold value S is set to an angular velocity 13 dps. In FIG. 7, it can be seen that the gain is maintained at a high level when mechanical vibration of the arm 21 occurs, and that the gain then significantly decreases as the mechanical vibration subsides. It can also be seen that the gain is reduced to 0 when the arm 21 is stopped. In this manner, the gain is decremented instead of suddenly decreasing from a high state to a low state.

Timing of Gain Adjustment

Next, the timing of gain adjustment for correcting the angular velocity information will be described.

Figure 8A:
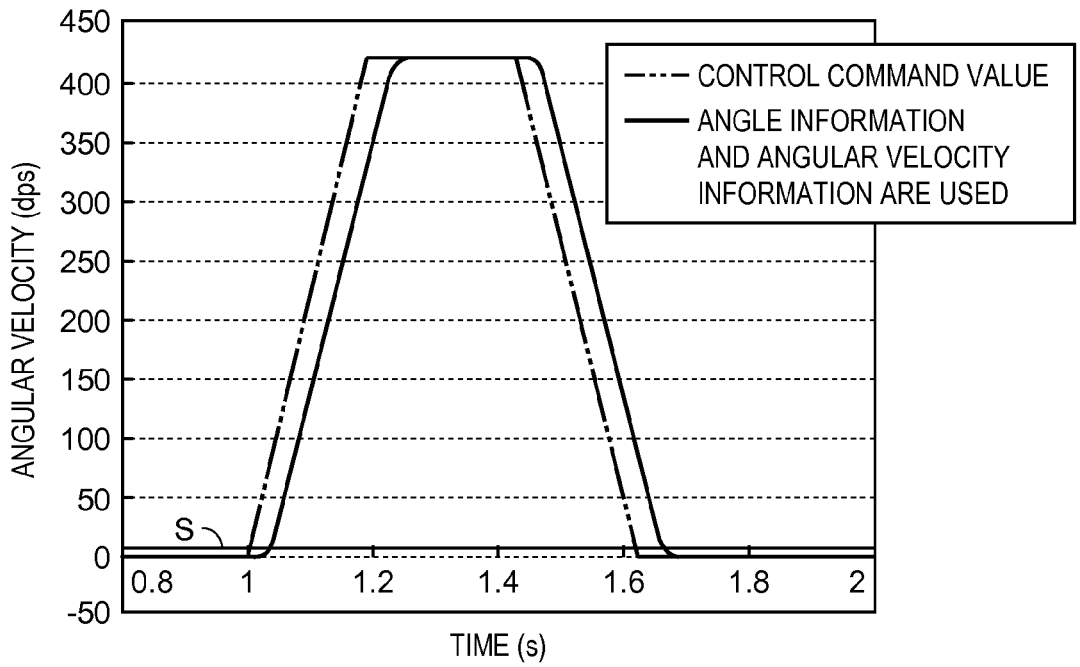
FIGS. 8A and 8B illustrate an example in which gain adjustment is carried out using a threshold value of angular velocity.
Figure 8B:
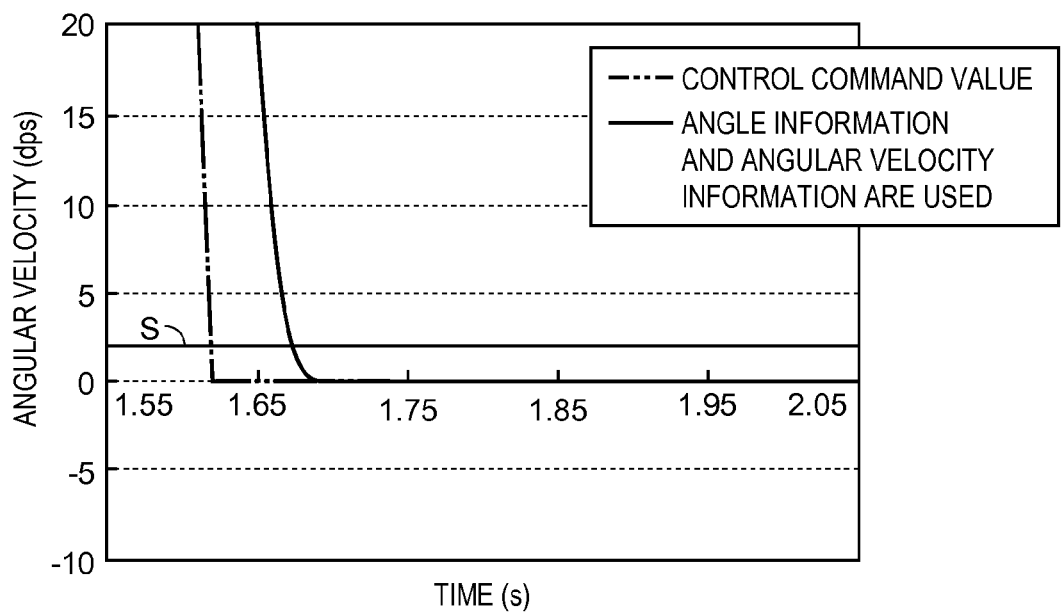

FIGS. 8A and 8B illustrate an example in which gain adjustment is carried out using a threshold value of angular velocity. FIG. 8A shows the relation between lapse of time and angular velocity. FIG. 8B is an enlarged view of FIG. 8A corresponding to a period just before the arm 21 stops. In FIGS. 8A and 8B, the graph indicated by a double chain-dotted line represents the angular velocity of the arm 21 designated every time elapsed as a control command value.

The graph indicated by a solid line represents the angular velocity for every time elapsed in the case where control to feed back a torsion angular velocity or the like is carried out using the control command value, the angle information and the angular velocity information. Here, when the control to feed back a torsion angular velocity or the like is carried out, as the arm 21 in the rotating state approaches a target position, the angular velocity decreases, and from the time point when the angular velocity reaches a threshold value S, gain adjustment is carried out to decrement the gain of the angular velocity information, as shown in FIG. 8B. Therefore, when the control to feed back a torsion angular velocity or the like is carried out, the angular velocity information which is decremented from the time point when the angular velocity reaches the threshold value S is used. Ultimately, only the control command value and the angle information are used without using the angular velocity information.

As described above, in this embodiment, the arm 21 in the standstill state starts rotating and the angular velocity reaches the threshold value S at the time point p1. From this time point p1, the gain is incremented to reach the target value K. Also, the arm 21 in the rotating state approaches the target position and the angular velocity reaches the threshold value S at the time point p2. From this time point p2, the gain is decremented to reach 0. Thus, there is no quick change in the gain. The occurrence of vibration at the time of switching between use and non-use of the angular velocity information can be restrained and the machine life can be extended by reduction in mechanical load on the drive source and decelerator.

Also, the gain is reduced with the slope of a quadratic curve where the variation width increases with the lapse of time, and the time required for gain adjustment is made longer than half the mechanical vibration period of the arm 21. Thus, since the change is gentle at the beginning of gain adjustment, the gain does not decrease significantly. At the time point when half the mechanical vibration period passes, at which point the threshold value can be exceeded again, the gain is not reduced to 0 and therefore vibration control can be effectively carried out. Also, since the change in the gain becomes steep with the lapse of time, vibration control can be effectively carried out even within the same control switching time. The gain can be reduced 0 quickly after the vibration subsides, while minimizing the loss of vibration controllability. The same can be applied to the case where the gain is increased with the slope of a quadratic curve where the variation width increases with the lapse of time.

Second Embodiment

Next, a robot according to a second embodiment will be described with reference to the drawings.

The robot according to the second embodiment has a similar configuration to the robot according to the first embodiment but is different in the timing of gain adjustment to correct angular velocity information.

Figure 9A:
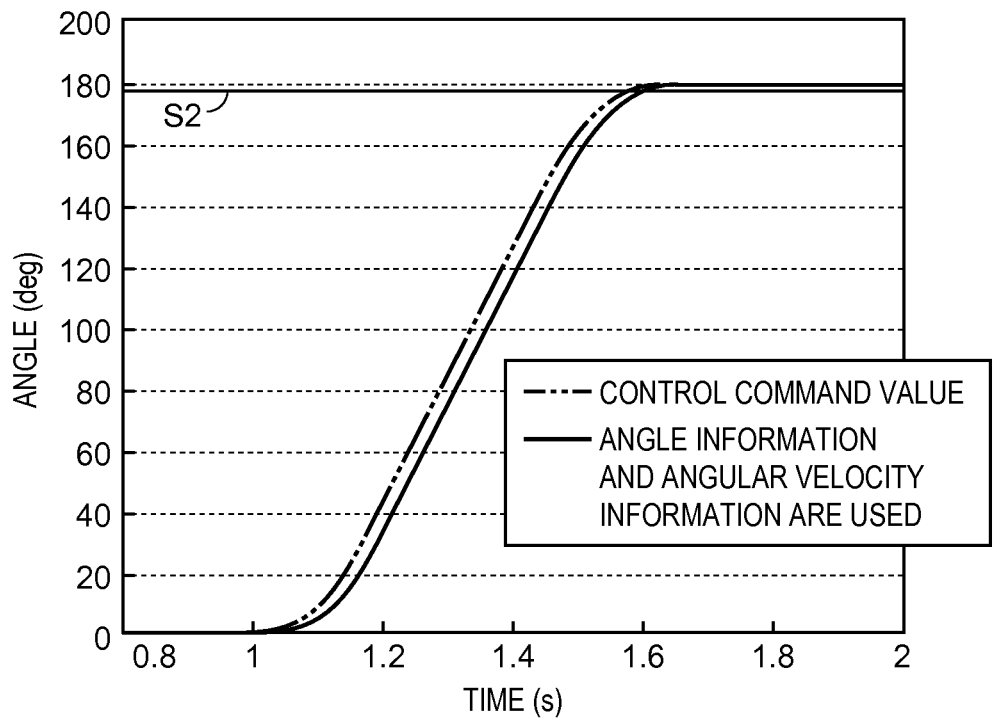
FIGS. 9A and 9B illustrate an example in which gain adjustment is carried out using a threshold value of angle.
Figure 9B:
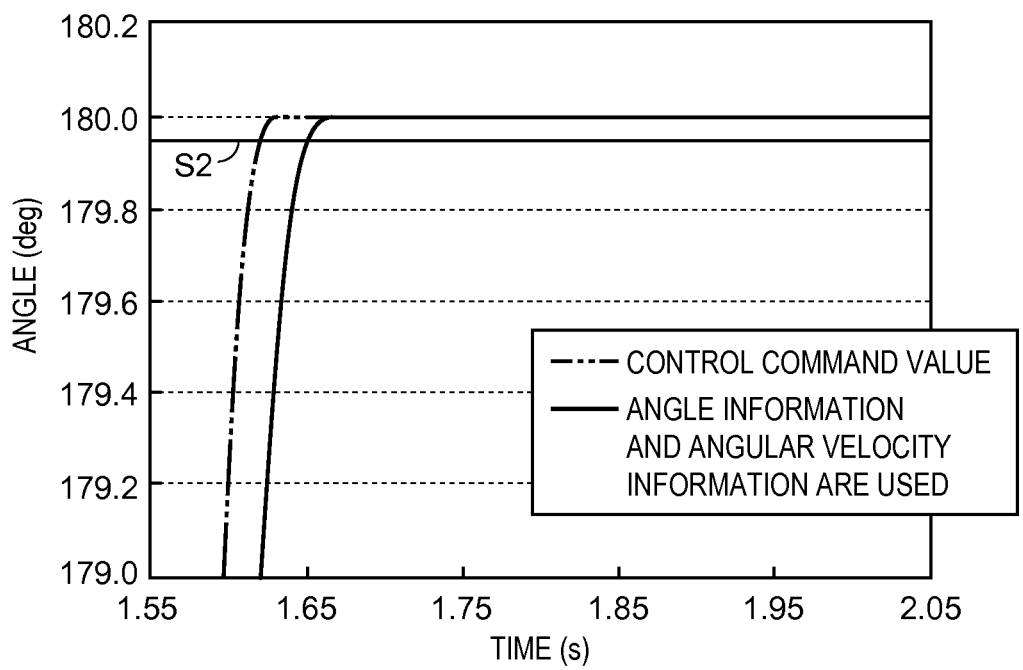

FIGS. 9A and 9B illustrate an example in which gain adjustment is carried out using a threshold value of angle. FIG. 9A shows the relation between lap of time and angle. FIG. 9B is an enlarged view of FIG. 9A corresponding to a period just before the arm 21 stops. In FIGS. 9A and 9B, the graph indicated by a double chain-dotted line represents the angle of the arm 21 designated every time elapsed as a control command value. The graph indicated by a solid line represents the angle for every time elapsed in the case where control to feed back a torsion angular velocity or the like is carried out using the control command value, the angle information and the angular velocity information. Here, when the control to feed back a torsion angular velocity or the like is carried out, the arm 21 in the rotating state approaches a final target angle, and from the time point when the angle reaches a threshold value S2, gain adjustment is carried out to decrement the gain of the angular velocity information, as shown in FIG. 9B. Therefore, when the control to feedback a torsion angular velocity or the like is carried out, the angular velocity information which is decremented from the time point when the angle reaches the threshold value S2 is used. Ultimately, only the control command value and the angle information are used without using the angular velocity information.

If noise is included in the angular velocity information, the noise causes vibration and therefore accuracy is lowered. By setting the threshold value S2 of the angle at which control is switched, to a value that is further away from a target standstill position than the angle of the vibration caused by the noise in the angular velocity information, the influence of the noise can be eliminated. Also, by switching to control using the control command value and the angle information, the occurrence of large vibration can be restrained, compared with the case where the angular velocity information including noise is used.

Figure 10A:
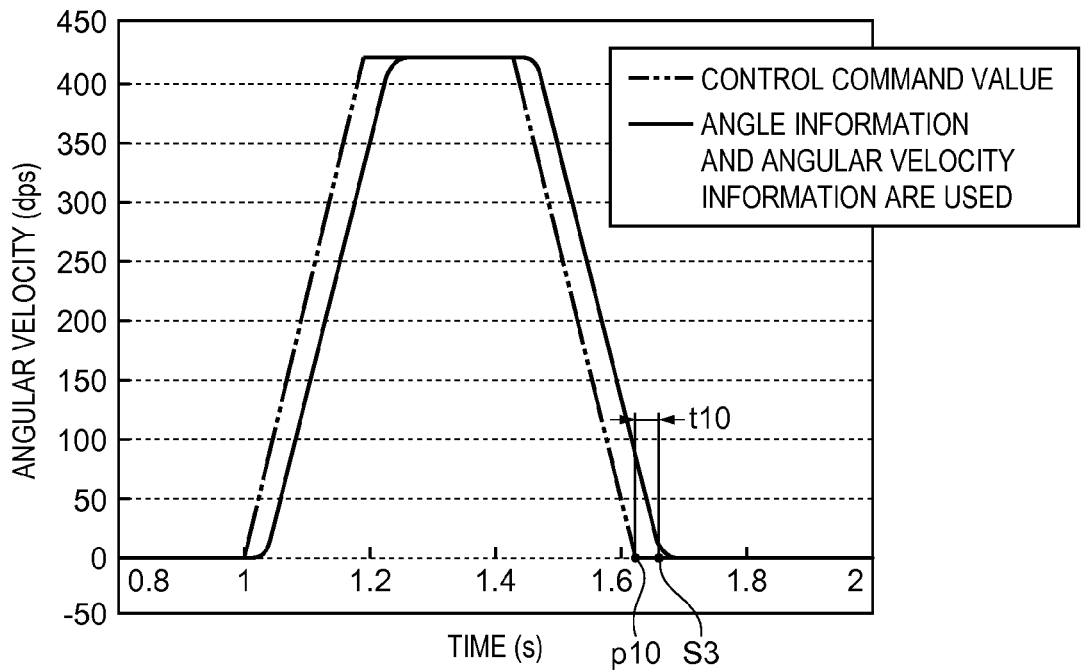
FIGS. 10A and 10B illustrate an example in which gain adjustment is carried out using a threshold value on a time axis based on a feature point of a control command value.
Figure 10B:
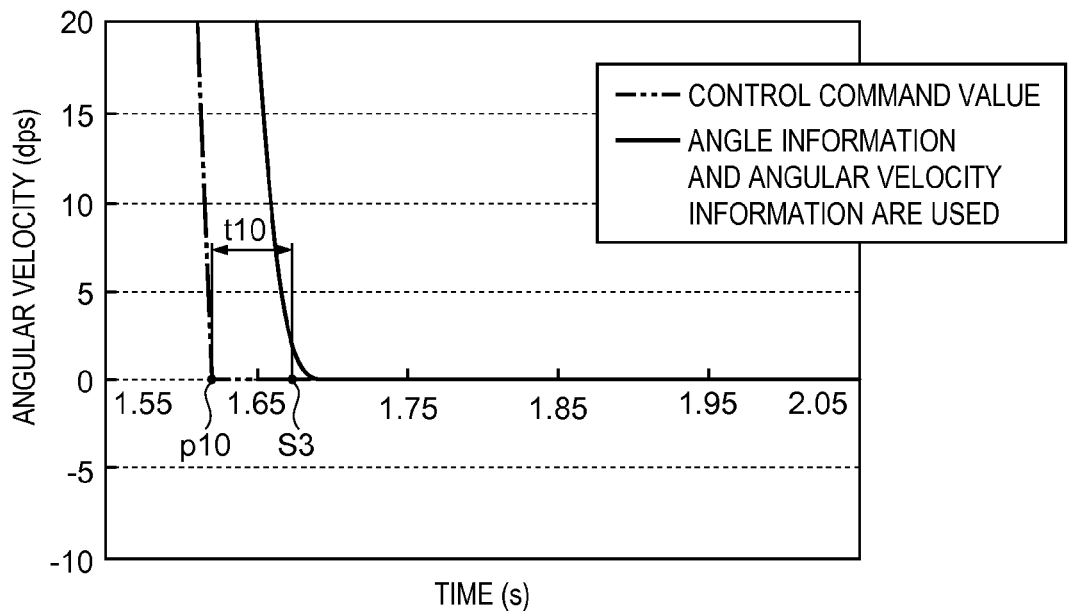

FIGS. 10A and 10B illustrate an example in which gain adjustment is carried out using a threshold value on a time axis based on a feature point of a control command value. FIG. 10A shows the relation between lapse of time and angular velocity. FIG. 10B is an enlarged view of FIG. 10A corresponding to a period just before the arm 21 stops. In FIGS. 10A and 10B, the graph indicated by a double chain-dotted line represents the angular velocity of the arm 21 designated every time elapsed as a control command value. The graph indicated by a solid line represents the angular velocity for every time elapsed in the case where control to feed back a torsion angular velocity or the like is carried out using the control command value, the angle information and the angular velocity information. Here, when the control to feed back a torsion angular velocity or the like is carried out, the time point after the lapse of a time t10 from a time point p10 when the angular velocity of the control command value reaches 0 as the arm 21 in the rotating state approaches a target position, is referred to as a threshold value S3, as shown in FIG. 10B. From this time point of the threshold value S3, gain adjustment is carried out to decrement the gain of the angular velocity information. Therefore, when the control to feed back a torsion angular velocity or the like is carried out, the angular velocity information which is decremented after the time elapsed of the angular velocity reaches the time point of the threshold value S3 is used. Ultimately, only the control command value and the angle information are used without using the angular velocity information.

As the predetermined time t10 passes from the time point when the angular velocity of the control command value reaches 0, the angular velocity of the member supply-removal arm 21 generally becomes 0. If the angular velocity of the member supply-removal arm 21 does not reach 0 and a torque command value to drive the arm drive motor 22 is outputted, it is highly probable that abnormality is generated in the control system. In such a case, by performing control using the control command value, the angle information and the gain-adjusted angular velocity information, such abnormality factors can be eliminated.

Figure 11A:
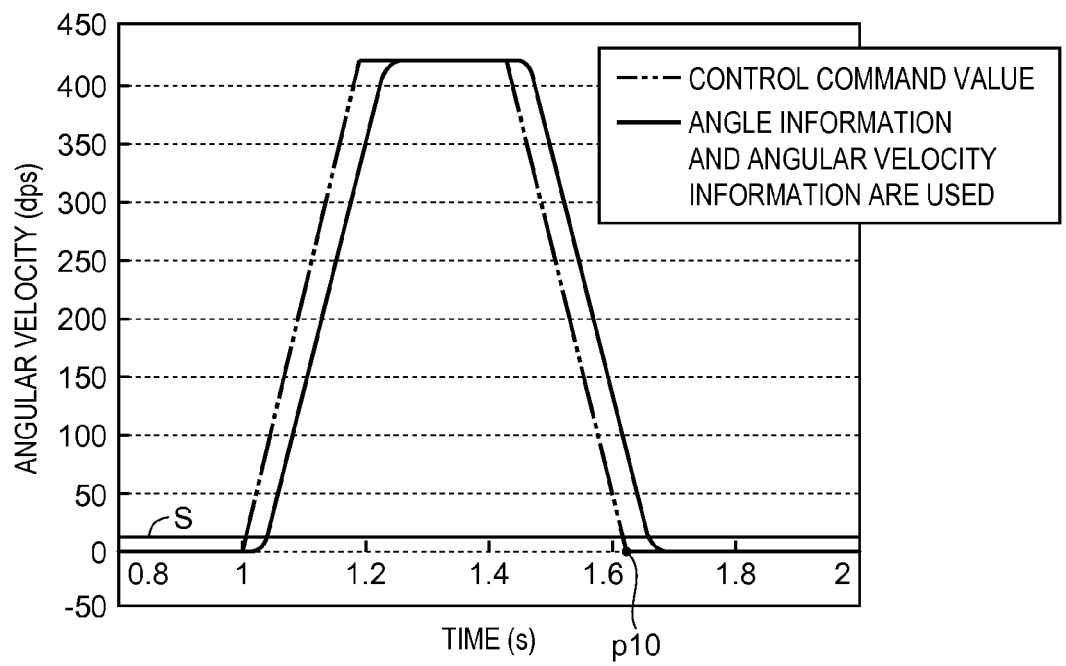
FIGS. 11A and 11B illustrate an example in which gain adjustment is carried out using a threshold value of angular velocity based on a feature point of a control command value.
Figure 11B:
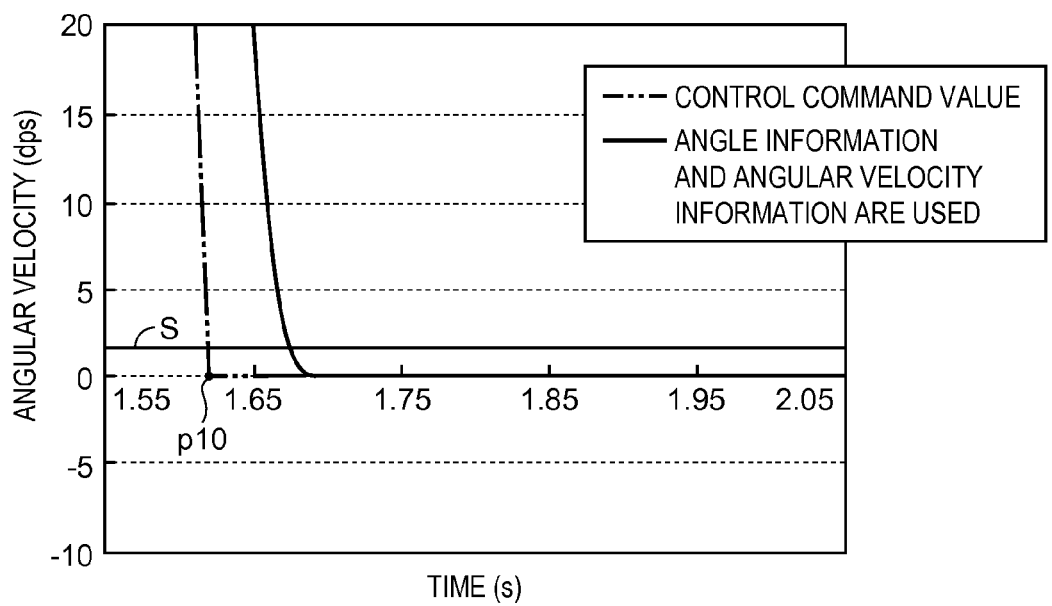

FIGS. 11A and 11B illustrate an example in which gain adjustment is carried out using a threshold value of angular velocity based on a feature point of a control command value. FIG. 11A shows the relation between lapse of time and angular velocity. FIG. 11B is an enlarged view of FIG. 11A corresponding to a period just before the arm 21 stops. In FIGS.

11A and 11B, the graph indicated by a double chain-dotted line represents the angular velocity of the arm 21 designated every time elapsed as a control command value. The graph indicated by a solid line represents the angular velocity for every time elapsed in the case where control to feed back a torsion angular velocity or the like is carried out using the control command value, the angle information and the angular velocity information. Here, when the control to feed back a torsion angular velocity or the like is carried out, after a time point 10p when the angular velocity of the control command value reaches 0 as the arm 21 in the rotating state approaches a target position, the angular velocity decreases and reaches a threshold value S, and from this time point, gain adjustment is carried out to decrement the gain of the angular velocity information, as shown in FIG. 11B. Therefore, when the control to feed back a torsion angular velocity or the like is carried out, the angular velocity information in which the angular velocity of the control command value is 0 and which is decremented from the time point when the angular velocity reaches the threshold value S is used. Ultimately, only the control command value and the angle information are used without using the angular velocity information.

Even when the angular velocity of the control command value is not 0, the angular velocity may be measured as temporarily exceeding the threshold value for some reasons. In such a case, by determining whether the angular velocity of the control command value is 0 or not, the accuracy of the determination of the angular velocity of the arm 21 using a threshold value can be improved.

In the embodiment, an example of gain adjustment of the angular velocity information just before the arm 21 stops is mainly described. However, this gain adjustment can be applied not only to just before the arm 21 stops but also to when the arm 21 in the standstill state starts rotating.

Third Embodiment

Next, various devices to which the robot according to the embodiments is applied will be described with reference to the drawings. Common components of the configuration of the various devices according to this embodiment and the robot according to the first embodiment shown in FIG. 1 are denoted by the same reference numerals and only different parts of the configuration will be described hereinafter.
Robot First, a robot to which the robot according to the above embodiments is applied and which has a different configuration from the embodiments will be described.

Figure 12:
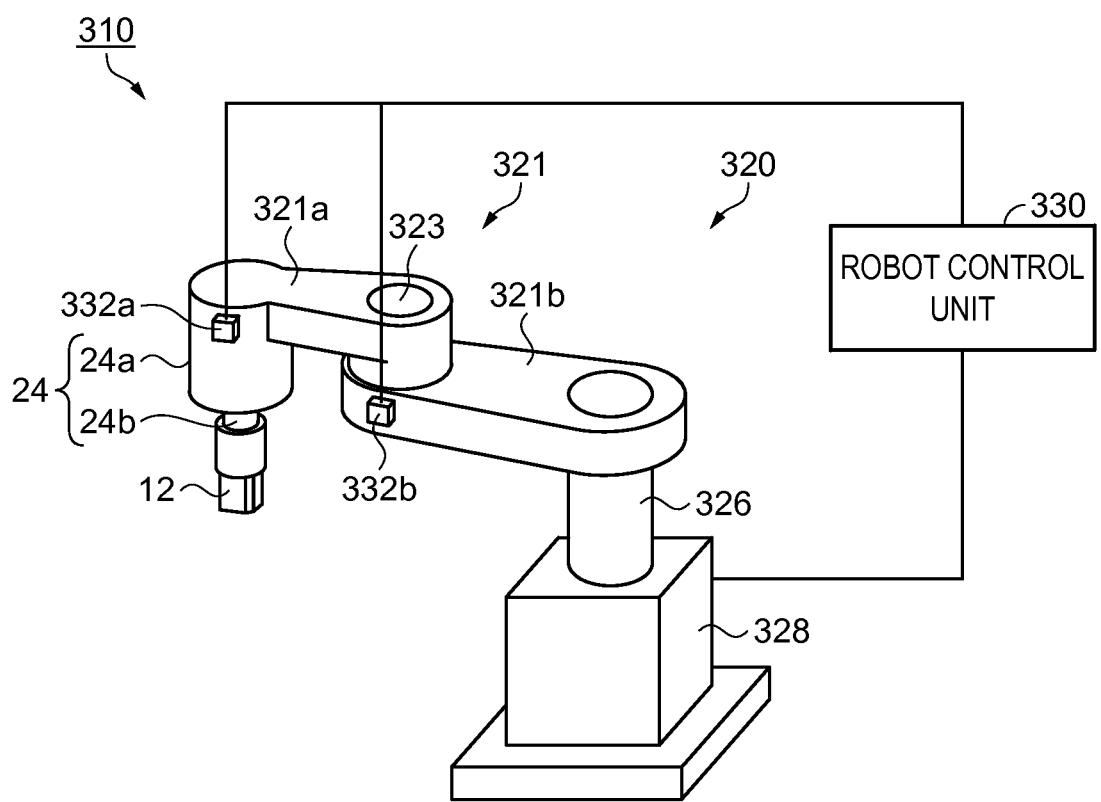
FIG. 12 is an external perspective view showing a schematic configuration of a robot according to a third embodiment.

FIG. 12 is an external perspective view showing a schematic configuration of a robot 310 according to a third embodiment. As shown in FIG. 12, the robot 310 includes a robot mechanism 320 and a robot control unit 330. The robot mechanism 320 includes a holding hand 12, a hand holding mechanism 24, an arm 321, an arm shaft portion 326, a machine stand 328, angular velocity sensors 332a, 332b, two angle sensors (not shown) and the like.

The machine stand 328 supports the arm shaft portion 326 via a built-in bearing mechanism (not shown) in such a way that the arm shaft portion 326 is rotatable about a rotation axis of the arm shaft portion 326. The arm shaft portion 326 is connected to the machine stand 328 via an arm drive motor (not shown) and an arm drive mechanism (not shown) which are installed within the machine stand 328, and the arm shaft portion 326 is rotated by the arm drive motor. The angle sensors are connected to the arm drive motor, and the rotation angle of the arm drive motor is measured by the angle sensors. One end of the arm 321 is fixed to an end of the arm shaft portion 326 that is opposite to the side supported by the machine stand 328. The arm 321 includes arm portions 321a, 321b and an arm joint portion 323. One of the arm portion 321a and one end of the arm portion 321b are connected with each other by the arm joint portion 323. An end of the arm portion 321b on the side opposite to the end connected to the arm joint portion 323 is fixed to the arm shaft portion 326. Since the arm shaft portion 326 is rotatable about the rotation axis of the arm shaft portion 326 in relation to the machine stand 328, the arm portion 321b fixed to one end of the arm shaft portion 326 is rotatable about the rotation axis of the arm shaft portion 326 in relation to the machine stand 328.

The arm portion 321b supports the arm portion 321a via the arm joint portion 323 in such a way that the arm portion 321a is rotatable about a rotation axis of the arm joint portion 323. The part of the arm joint portion 323 where the arm portion 321a is fixed is connected via an arm portion drive motor (not shown) and an arm portion drive mechanism (not shown) which are installed within the arm portion 321b, and this part is rotated by the arm portion drive motor. The arm portion 231a and the arm portion 321b can adjust the angle formed by these two portions at the arm joint portion 323. That is, the arm 321 can bend and stretch at the arm joint portion 323. An arm angle sensor is connected to the arm portion drive motor, and the rotation angle of the arm portion drive motor is measured by the arm angle sensor. By measuring the rotation angle of the arm portion drive motor, the rotation angle of the arm portion 321a to the arm portion 321b can be measured. The axial direction of the rotation axis of the arm shaft portion 326 and the axial direction of the rotation axis of the arm joint portion 323 are substantially parallel to each other.

The hand holding mechanism 24 is fixed to an end of the arm portion 321a that is opposite to the side fixed to the arm joint portion 323. The hand holding mechanism 24 includes a holding bearing 24a fixed to the arm portion 321a and a holding mechanism shaft 24b slidably supported by the holding bearing 24a. The holding mechanism shaft 24b can be slid in the axial direction of the holding mechanism shaft 24b in relation to the holding bearing 24a, by an up-and-down drive source, not shown. The axial direction of the holding mechanism shaft 24b is substantially parallel to the axial direction of the rotation axis of the arm shaft portion 326 and the axial direction of the rotation axis of the arm joint portion 323. The holding hand 12 is attached to a free end of the holding mechanism shaft 24b. As the arm 321 is rotated and bent or stretched, the holding hand 12 is situated at a position facing an object to be carried. As the holding mechanism shaft 24b is slid in relation to the holding bearing 24a, the holding hand 12 is moved into contact with or away from the object to be carried, and the object to be carried that is held by the holding hand 12 is lifted from the place where the object is placed, or is moved toward the place where the object is to be placed.

On the hand holding mechanism 24 to which the holding hand 12 is attached, the angular velocity sensor 332a is fixed to the side opposite to the holding hand 12. The angular velocity sensor 332a is fixed at the distal end of the arm portion 321a and can measure the angular velocity at which the arm portion 321a is rotated.

The angular velocity sensor 332b is fixed on a lateral surface at the one end of the arm portion 321b that is connected to the arm joint portion 323. Therefore, the angular velocity sensor 332b is fixed at the distal end of the arm portion 321b and can measure the angular velocity at which the arm portion 321b is rotated.

The robot control unit 330 supervises and controls the operation of each part of the robot 310, based on a control program that is input in advance via an information input and output device (not shown). The robot control unit 330 can control the operation of the arm portion 321*b* based on angular velocity information obtained by the angular velocity sensor 332*b* and angle information obtained by the angle sensor installed in the machine stand 328. At the same time, the robot control unit 330 can control a relative operation of the arm portion 321*a* to the arm portion 321*b*, based on angular velocity information obtained by the angular velocity sensor 332*a* and angle information obtained by the arm angle sensor installed in the arm portion 321*b*. That is, the operation of the arm 321 including the operation of the arm portion 321*a* and the operation of the arm portion 321*b* can be controlled using the gain-adjusted angular velocity information and the angle information, as in the above embodiments.

Carrier Device

Next, a carrier device to which the robot according to the embodiments will be described.

Figure 13A:
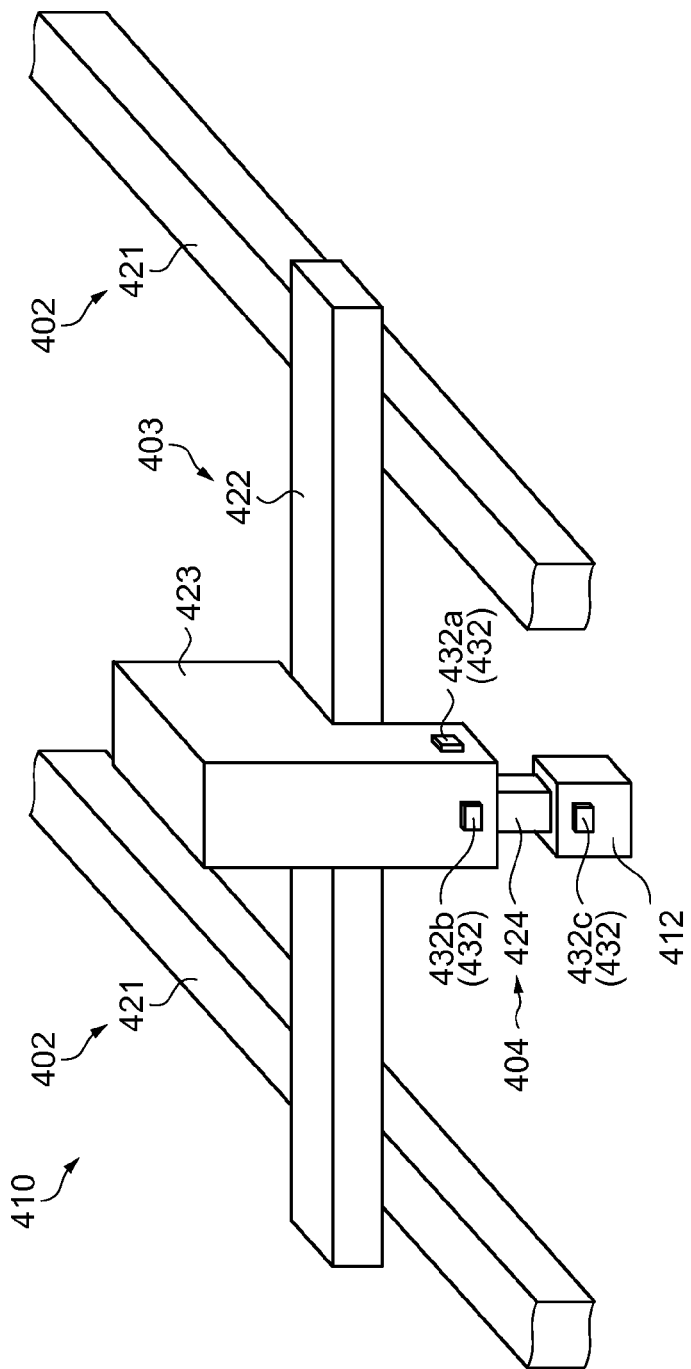
FIGS. 13A and 13B are external perspective views showing a schematic configuration of a carrier device.
Figure 13B:
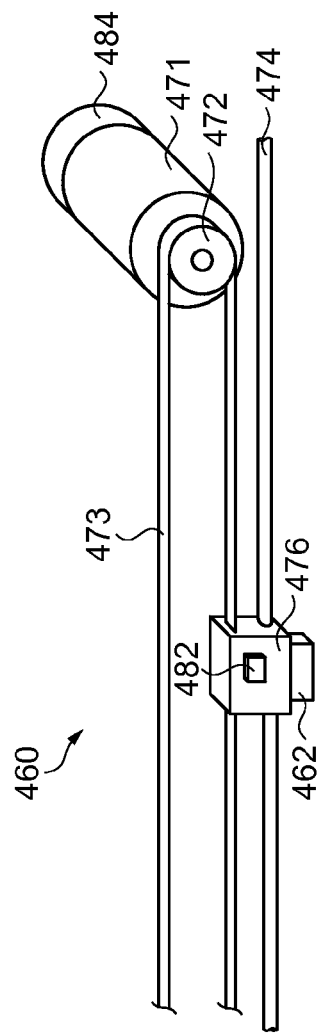

FIGS. 13A and 13B are external perspective views showing a schematic configuration of a carrier device. FIG. 13A is an external perspective view showing a schematic configuration of a suspended ceiling carrier device. FIG. 13B is an external perspective view showing a schematic configuration of a head carrier device in a printing apparatus.

Ceiling-Suspended Carrier Device

As shown in FIG. 13A, a ceiling-suspended carrier device 410 includes a main scanning direction movement mechanism 402, a sub scanning direction movement mechanism 403, an up-and-down movement mechanism 404, a holding mechanism 412, a distance sensor, an acceleration sensor 432, a carrier device control unit (not shown) and the like.

The main scanning direction movement mechanism 402 includes a pair of main scanning guide rails 421, 421 extending in a main scanning direction, a main scanning linear motor formed on the main scanning guide rails 421, and a main scanning slider formed on a scanning plate 422. The scanning plate 422 is laid between the pair of main scanning guide rails 421, 421 and extends in a sub scanning direction that is substantially orthogonal to the main scanning direction. The scanning plate 422 is freely moved in the main scanning direction by the main scanning linear motor and the main scanning slider. The pair of main scanning guide rails 421, 421 is fixed, for example, by being suspended on the ceiling or the like.

The sub scanning direction movement mechanism 403 includes a sub scanning linear motor formed on the scanning plate 422 and a sub scanning slider formed on a sub scanning frame 423. The sub scanning frame 423 is freely moved in the sub scanning direction by the sub scanning linear motor and the sub scanning slider.

The up-and-down movement mechanism 404 includes a ball bearing arranged on the sub scanning frame 423, a ball bearing drive motor, and a ball screw fixed to an up-and-down shaft 424. The up-and-down shaft 424 is moved up and down by the ball bearing, the ball bearing drive motor and the ball screw.

The holding mechanism 412 fixed on the side of the up-and-down shaft 424 that is opposite to the ball screw is moved to an arbitrary position in the main scanning direction and the sub scanning direction by the main scanning direction movement mechanism 402 and the sub scanning direction movement mechanism 403, and can be moved into contact with or away from an object to be carried, by the up-and-down movement mechanism 404. The carrier device control unit supervises and controls the operation of each part of the ceiling-suspended carrier device 410 based on a control program that is inputted in advance via an information input and output device (not shown).

To the main scanning linear motor, the sub scanning linear motor and the ball bearing drive motor, a distance sensor which measures a driving distance generated by each of these motors is connected.

On the sub scanning frame 423 or the holding mechanism 412, an acceleration sensor 432*a*, an acceleration sensor 432*b* or an acceleration sensor 432*c* is fixed. The acceleration sensor 432*a*, the acceleration sensor 432*b* and the acceleration sensor 432*c* can measure acceleration in the main scanning direction, the sub scanning direction and the up-and-down direction. The movement of the holding mechanism 412 can be controlled based on moving distance information in each direction obtained by the distance sensor connected to the main scanning linear motor, the sub scanning linear motor or the ball bearing drive motor, and acceleration information in each direction obtained by the acceleration sensor 432*a*, the acceleration sensor 432*b* or the acceleration sensor 432*c*. As the distance sensor, for example, a linear encoder can be used.

When executing control of the movement of the holding mechanism 412 using the moving distance information and the acceleration information, a threshold value is set in advance for the moving distance information or the acceleration information or the like, then the moving distance information or the acceleration information or the like is compared with the threshold value, and gain adjustment of the acceleration information is carried out. An operation control unit of the carrier device control unit carries out control using a control command value, the moving distance information and the gain-adjusted acceleration information. By carrying out this control, the operations of the main scanning direction movement mechanism 402, the sub scanning direction movement mechanism 403 and the up-and-down movement mechanism 404 are controlled and the holding mechanism 412 is moved to and positioned at an arbitrary position.

Head Carrier Device

As shown in FIG. 13B, a head carrier device 460 is to move an ejection head 462 of a printing apparatus and includes a head carriage 476, a carriage shaft 474, a drive belt 473, a drive pulley 472, a drive motor 471, an acceleration sensor 482, an encoder 484 and the like. The printing apparatus includes a printing apparatus control unit (not shown) which supervises and controls the operation of each part of the printing apparatus.

The drive motor 471 is fixed on a device frame, not shown. The drive pulley 472 is fixed at one end of a drive shaft of the drive motor 471. The drive belt 473 is stretched by the drive pulley 472 and a driven pulley, not shown. The drive belt 473 is driven by the drive motor 471. The carriage shaft 474 is arranged parallel to the direction in which the drive belt 473 extends. The head carriage 476 is fitted with the carriage shaft 474 slidably in the axial direction of carriage shaft 474. The head carriage 476 is fixed with the drive belt 473. As the drive belt 473 is driven, the head carriage 476 is moved along the carriage shaft 474. The ejection head 462 held on the head carriage 476 is moved in the axial direction of the carriage shaft 474 and is held at an arbitrary position. The printing apparatus control unit supervises and controls the operation of each part of the printing apparatus, based on a control program that is inputted in advance via an information input and output device (not shown).

The encoder 484 is connected to the drive shaft of the drive motor 471 and can measure the moving distance of the ejection head 462 by measuring the rotation angle of the drive motor 471. Angle information of the drive motor 471 corresponding to the position of the ejection head 462 corresponding to the moving distance is referred to as position information of the drive motor 471. The acceleration sensor 482 is fixed to the head carriage 476 and can measure the acceleration acting on the head carriage 476 as the head carriage 476 is driven. The movement of the ejection head 462 held on the head carriage 476 can be controlled based on the position information obtained by the encoder 484 and the acceleration information obtained by the acceleration sensor 482.

When executing control of the movement of the ejection head 462 using the position information and the acceleration information, a threshold value is set for the position information or the acceleration information or the like, then the position information or the acceleration information or the like is compared with the threshold value, and gain adjustment of the acceleration information is carried out. The operation control unit of the printing apparatus control unit carries out control using a control command value, the position information and the gain-adjusted acceleration information. By carrying out this control, the operation of the drive motor 471 is controlled and the ejection head 462 held on the head carriage 476 is moved to and positioned at an arbitrary position.

Laser Printer

Next, a laser printer 510 will be described as an example in which the robot according to the above embodiments is applied to control the rotation of a drum-shaped member.

Figure 14:
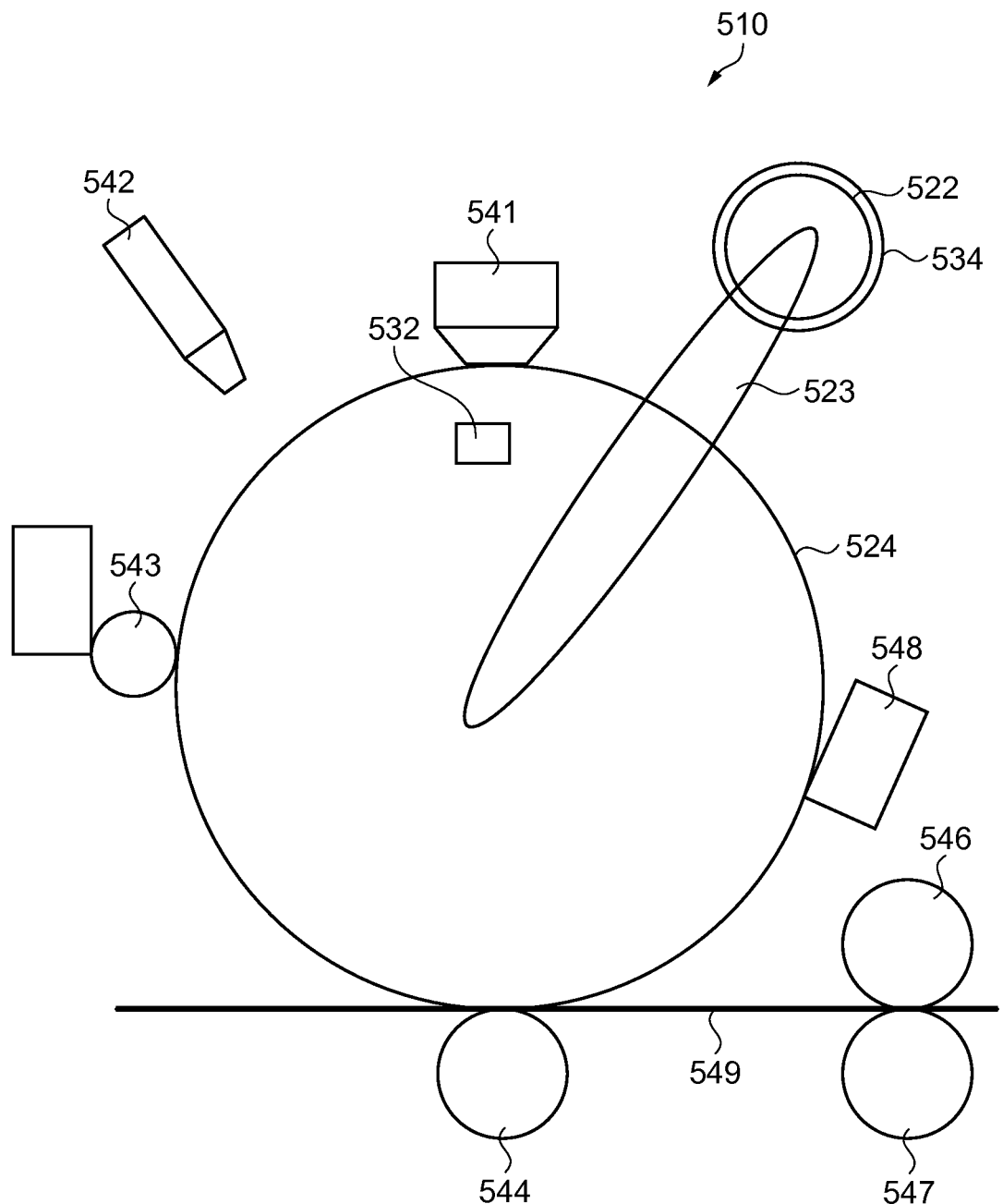
FIG. 14 is an explanatory view showing a schematic configuration of essential parts of a laser printer.

FIG. 14 is an explanatory view showing a schematic configuration of essential parts of the laser printer. As shown in FIG. 14, the laser printer 510 includes a photoconductive drum 524, a drum drive motor 522, an encoder 534, a drive transmission mechanism 523, a charging device 541, a laser oscillation device 542, a toner supply device 543, a transfer roller 544, a fixing roller 546 and a fixing roller 547, a toner collecting device 548, an angular velocity sensor 532, a printer control unit (not shown) and the like.

The photoconductive drum 524 is connected to the drum drive motor 522 via the drive transmission mechanism 523 and is rotated about a rotation axis by the drum drive motor 522. The surface of the photoconductive drum 524 is negatively charged by the charging device 541. As the charged part is left in the shape of a print by the laser oscillation device 542, the shape of the print is drawn on the surface. A toner supplied by the toner supply device 543 adheres to the shape of the print that is charged. As a sheet 549 is pressed in contact with the photoconductive drum 524 by the transfer roller 544, the toner is transferred to the sheet 549. The toner transferred to the sheet 549 is fixed by being pressurized and heated by the fixing roller 546 and the fixing roller 547. On the surface of the photoconductive drum 524 after transferring the toner, unnecessary toner is collected by the toner collecting device 548. Then, the foregoing process is repeated again.

The printer control unit supervises and controls the operation of each part of the laser printer 510 based on a control program that is inputted in advance via an information input and output device (not shown).

The encoder 534 is connected to the drive shaft of the drum drive motor 522. As the encoder 534 measures the rotation angle of the drum drive motor 522, angle information of the photoconductive drum 524 can be acquired. The angular velocity sensor 532 is fixed to the photoconductive drum 524. Information of the angular velocity at which the photoconductive drum 524 rotates can be acquired by the angular velocity sensor 532. The rotation of the photoconductive drum 524 can be controlled based on the angle information of the drum drive motor 522 obtained by the encoder 534 and the angular velocity information obtained by the angular velocity sensor 532.

When executing control of the rotation of the photoconductive drum 524 using the angle information and the angular velocity information, a threshold value is set for the angle information or the angular velocity information or the like, and the angle information or the angular velocity information or the like is compared with the threshold value. Gain adjustment of the angular velocity information is thus carried out. An operation control unit of the printer control unit carries out control using a control command value, the angle information and the gain-adjusted angular velocity information. By carrying out this control, the operation of the drum drive motor 522 is controlled to rotate the photoconductive drum 524 by an arbitrary angle.

While some preferred embodiments are described above with reference to the accompanying drawings, preferred embodiments are not limited to the above embodiments. As a matter of course, various changes can be made to the embodiments without departing from the scope. The following forms of embodiment can also be employed.

Modification 1

In the above embodiments, examples in which a threshold value is prescribed for the angular velocity information, the angle information, the moving distance information, the acceleration information, the position information and the like, and examples in which a threshold value is prescribed on a time axis based on a feature point of the control command value are described. However, subjects of threshold prescription are not limited to these examples. A threshold value may be set for noise that influences the value of the angular velocity information or the acceleration information, and gain adjustment of the angular velocity information or the acceleration information may be carried out depending on the level of the noise. The noise that influences the value of the angular velocity information or the acceleration information may include mechanical vibration of the device itself, vibration of a device that exists in the surroundings, fluctuations in electric power supplied to the device, ambient electromagnetic noise and the like.

Modification 2

In the above embodiments, examples in which a threshold value is set for the angular velocity information obtained by the angular velocity sensor 32 and the acceleration information obtained by the acceleration sensor 432 are described. However, subjects of threshold prescription are not limited to these examples. A threshold value may be prescribed for a single or multiple integral value of the angular velocity information or the acceleration information. The integral value of the acceleration information is velocity information, and the velocity information can be handled similarly to the angular velocity information. A double integral value of the acceleration information and an integral value of the angular velocity information are information of the moving distance, and the information of the moving distance can be handled similarly to the angle information and the position information.

Modification 3

In the above embodiments, examples in which a threshold value is prescribed for the angle information obtained by the angle sensor 34 and the moving distance information obtained by the distance sensor are described. However, subjects of threshold prescription are not limited to these examples. A threshold value may be prescribed for a single or multiple differential value of the angle information or the moving distance information. The differential value of the angle information or the moving distance information is angular velocity or moving speed and can be handled similarly to the angular velocity information. A double differential value of the angle information or the moving distance information is angular acceleration or acceleration and can be handled similarly to the acceleration information.

Modification 4

In the above embodiments, examples in which a threshold value is prescribed for the angle information, the angular velocity information, the moving distance information, the acceleration information, the position information and the like, and examples in which a threshold value is prescribed on a time axis based on a feature point of the control command value are described. Each of these subjects for which a threshold value is prescribed is used separately when executing control. However, control may be executed using plural subjects for which a threshold value is prescribed. For example, only when both the angle information and the angular velocity information exceed the threshold value, control to carry out gain adjustment of the angular velocity information may be executed, whereas when at least one of the angle information and the angular velocity information does not exceed the threshold value, control not to carry out gain adjustment may be executed. Also, the angle information, the angular velocity information, the moving distance information, the acceleration information, the position information or the like, or the time axis corresponding to the feature point of the control command value or the like, may be combined with noise level that influences the value of the angular velocity information or the acceleration information, described in Modification 1. In this case, for example, only when both the angle information, the angular velocity information, the moving distance information, the acceleration information, the position information or the like, or the time axis corresponding to the feature point of the control command value or the like, and the noise level exceed the threshold value, control to carry out gain adjustment is executed, whereas when at least one of these subjects does not exceed the threshold value, control not to carry out gain adjustment is executed. Thus, a situation where control to carry out gain adjustment in order to avoid adverse effects of noise is executed though the noise of the angular velocity information or the like is maintained at a low level, can be avoided.

Modification 5

In the above embodiments, the robot 10 having the robot mechanism 20, the robot 310 having the robot mechanism 320, the ceiling suspended carrier device 410, the head carrier device 460 provided in the printing apparatus, the drum drive device provided in the laser printer 510 and the like are described as examples of the robot and the carrier device. However, the robot and the carrier device that can be controlled suitably by a control method using the above inertial sensor are not limited to these exemplified devices. By a control method using the above inertial sensor, a device in which it is preferable to move a moving body quickly to a predetermined target position and to stop the moving body at the position accurately and quickly, can be controlled suitably.

The entire disclosure of Japanese Patent Application No. 2011-205676, filed Sep. 21, 2011 is expressly incorporated by reference herein.

What is claimed is:

1. A robot comprising:
    an arm;
    a drive source;
    an angle sensor;
    an inertial sensor; and
    a control command generating unit,
    wherein
    the arm is rotatably supported at one end,
    the drive source rotates the arm,
    the angle sensor detects a rotational angle of the drive source and outputs angle information,
    the inertial sensor is attached to the arm, detects an inertial force acting on the arm, and outputs inertial force information,
    the control command generating unit outputs a control command value which prescribes a rotational operation of the arm,
    a weighting adjusting unit incrementally or decrementally changes and thus adjusts a weighting value of the inertial force information, and
    an arm operation control unit controls an operation of the arm based on the control command value, the angle information, and the inertial force information weighted with the weighting value.

2. The robot according to claim 1, wherein the weighting adjusting unit carries out at least one of an adjustment to increment the weighting value of the inertial force information in the case where the arm shifts from a standstill state to a rotating state and an adjustment to decrement the weighting value of the inertial force information in the case where the arm shifts from the rotating state to the standstill state.

3. The robot according to claim 1, wherein the weighting adjusting unit increases a variation width of the weighting value with the lapse of time.

4. The robot according to claim 1, wherein the weighting adjusting unit changes the weighting value during a time period equal to or longer than half a vibration period of the arm due to the rotation of the arm.

5. The robot according to claim 1, wherein the weighting adjusting unit compares the inertial force information with a threshold value that is preset for the inertial force information and changes the weighting value.

6. The robot according to claim 1, wherein the weighting adjusting unit compares the angle information with a threshold value that is preset for the angle information and changes the weighting value.

7. The robot according to claim 1, wherein the weighting adjusting unit compares a time elapsed from a time point when the rotational operation of the arm prescribed by the control command value stops, with a threshold value that is preset for the time elapsed, and changes the weighting value.

8. A robot comprising:
    an arm;
    a drive source;
    an angle sensor;
    an inertial sensor; and
    a control command generating unit,
    wherein
    the arm is rotatably supported at one end,
    the drive source rotates the arm,
    the angle sensor detects a rotational angle of the drive source and outputs angle information,
    the inertial sensor is attached to the arm, detects an inertial force acting on the arm, and outputs inertial force information,
    the control command generating unit outputs a control command value which prescribes a rotational operation of the arm,
    a weighting adjusting unit carries out at least one of an adjustment to increment the weighting value of the inertial force information in the case where the arm shifts from a standstill state to a rotating state and an adjustment to decrement the weighting value of the inertial force information in the case where the arm shifts from the rotating state to the standstill state, and an arm operation control unit controls an operation of the arm based on the control command value, the angle information, and the inertial force information weighted with the weighting value.

9. The robot according to claim 8, wherein
the weighting adjusting unit increases a variation width of the weighting value with the lapse of time.

10. The robot according to claim 8, wherein
the weighting adjusting unit changes the weighting value during a time period equal to or longer than half a vibration period of the arm due to the rotation of the arm.

11. The robot according to claim 8, wherein
the weighting adjusting unit compares the inertial force information with a threshold value that is preset for the inertial force information and changes the weighting value.

12. The robot according to claim 8, wherein
the weighting adjusting unit compares the angle information with a threshold value that is preset for the angle information and changes the weighting value.

13. The robot according to claim 8, wherein
the weighting adjusting unit compares a time elapsed from a time point when the rotational operation of the arm prescribed by the control command value stops, with a threshold value that is preset for the time elapsed, and changes the weighting value.

14. A robot comprising:
a main scanning direction movement mechanism;
a sub scanning direction movement mechanism;
an up-and-down movement mechanism, a holding mechanism;
plural distance sensors; and
plural acceleration sensors,
wherein
the main scanning direction movement mechanism includes plural main scanning guide rails, a main scanning linear motor, a scanning plate, and a main scanning slider,
the main scanning linear motor is formed on the plural main scanning guide rails,
the scanning plate is laid between the plural main scanning guide rails, extends in a sub scanning direction that is substantially orthogonal to a main scanning direction, and can be moved in the main scanning direction by the main scanning linear motor and the main scanning slider,
the sub scanning direction movement mechanism includes a sub scanning linear motor formed on the scanning plate and a sub scanning slider formed on a sub scanning frame,
the sub scanning frame can be moved in the sub scanning direction by the sub scanning linear motor and the sub scanning slider,
the up-and-down movement mechanism includes a ball bearing arranged on the sub scanning frame, a ball bearing drive motor, and a ball screw fixed to an up-and-down shaft,
the up-and-down shaft can be moved up and down by the ball bearing, the ball bearing drive motor and the ball screw,
the holding mechanism can be moved by the main scanning direction movement mechanism, the sub scanning direction movement mechanism and the up-and-down movement mechanism,
the distance sensors detect moving distance information of movement generated by each of the main scanning linear motor, the sub scanning linear motor and the ball bearing drive motor,
the acceleration sensors detect acceleration information in each of the main scanning direction, the sub scanning direction and an up-and-down direction, and
movement of the holding mechanism is controlled based on the moving distance information and the acceleration information.

15. The robot according to claim 14, wherein
a threshold value is set for the moving distance information or the acceleration information, the moving distance information or the acceleration information is compared with the threshold value, a weighting value of the acceleration information is adjusted, and the holding mechanism is moved and positioned.

* * * * *